(12) United States Patent
Ikari

(10) Patent No.: US 8,233,165 B2
(45) Date of Patent: Jul. 31, 2012

(54) DOCUMENT PROCESSING APPARATUS AND DOCUMENT PROCESSING METHOD

(75) Inventor: Daiki Ikari, Ayase (JP)

(73) Assignee: Canon Kabushiki Kaisha (JP)

( * ) Notice: Subject to any disclaimer, the term of this patent is extended or adjusted under 35 U.S.C. 154(b) by 708 days.

(21) Appl. No.: 12/372,388

(22) Filed: Feb. 17, 2009

(65) Prior Publication Data

US 2009/0207454 A1  Aug. 20, 2009

(30) Foreign Application Priority Data

Feb. 18, 2008 (JP) .................................. 2008-036033

(51) Int. Cl.
*G06K 15/00* (2006.01)
*G06K 9/00* (2006.01)

(52) U.S. Cl. ...................... 358/1.13; 358/1.14; 358/3.28; 358/448; 399/366; 382/100

(58) Field of Classification Search ........ 358/1.13–1.15, 358/3.28, 471, 448; 382/100; 399/366
See application file for complete search history.

(56) References Cited

U.S. PATENT DOCUMENTS

| | | | | |
|---|---|---|---|---|
| 6,980,331 | B1* | 12/2005 | Mooney et al. | 358/400 |
| 7,936,897 | B2* | 5/2011 | Tanaka | 382/100 |
| 2001/0011282 | A1 | 8/2001 | Katsumata et al. | |
| 2005/0225792 | A1* | 10/2005 | Morita | 358/1.14 |
| 2005/0259297 | A1* | 11/2005 | Tanaka | 358/3.28 |
| 2007/0133035 | A1* | 6/2007 | Kondo et al. | 358/1.14 |
| 2008/0100880 | A1* | 5/2008 | Matsunoshita | 358/471 |
| 2008/0101651 | A1* | 5/2008 | Matsunoshita | 382/100 |
| 2009/0074236 | A1* | 3/2009 | Kihara | 382/100 |
| 2009/0175495 | A1* | 7/2009 | Kamei et al. | 382/100 |

FOREIGN PATENT DOCUMENTS

| | | |
|---|---|---|
| JP | 08-088707 A | 4/1996 |
| JP | 10-255027 A | 9/1998 |
| JP | 11-110457 | 4/1999 |
| JP | 2003-99700 A | 4/2003 |
| JP | 2004-213304 A | 7/2004 |

OTHER PUBLICATIONS

Office Action Issued in Corresponding Japanese Patent Application No. 2008-036033 dated May 15, 2012.

* cited by examiner

*Primary Examiner* — Kimberly A Williams

(74) *Attorney, Agent, or Firm* — Rossi, Kimms & McDowell LLP

(57) ABSTRACT

A document processing apparatus which is capable of causing predetermined processes to be performed using sheets of one fixed format, in both of the case of scanning a fixed format sheet which has a description entered therein and the case of scanning a sheet which has a description entered therein but is other than the fixed format sheet. When a fixed format sheet having an entry made thereto is scanned in, a multifunction machine executes a first document processing process. When a fixed format sheet has been previously scanned in, if a sheet other than the fixed format sheet is scanned in, the multifunction machine executes s second document processing process. When no fixed format sheet has not been previously scanned in, if a sheet other than the fixed format sheet is scanned in, the multifunction machine executes a usual process.

9 Claims, 18 Drawing Sheets

FIG. 9

| IDENTIFIER INFORMATION | FIXED FORMAT INFORMATION ||||||| FIRST DOCUMENT PROCESSING PROCESS | SECOND DOCUMENT PROCESSING PROCESS |
|---|---|---|---|---|---|---|---|---|---|
| | ADDRESS OF LOCATION FOR STORING FIXED FORMAT INFORMATION | HANDWRITING AREA A || HANDWRITING AREA B || HANDWRITING AREA C || | |
| | | HORIZONTAL RANGE | VERTICAL RANGE | HORIZONTAL RANGE | VERTICAL RANGE | HORIZONTAL RANGE | VERTICAL RANGE | | |
| ABCD001 | 0×1000 | (10,80) | (20,25) | (10,80) | (40,45) | (10,240) | (60,110) | EXTRACT HANDWRITTEN CHARACTERS AMD STORE THE SAME IN DATABASE OF FILE SERVER | STORE IMAGE DATA IN NON-FIXED FORMAT FOLDER OF FILE SERVER |
| ABCD002 | 0×1100 | (10,80) | (20,25) | (10,80) | (40,45) | | | EXTRACT HANDWRITTEN CHARACTERS AMD STORE THE SAME IN DATABASE OF FILE SERVER, AND ACCESS WORKFLOW SERVER TO START DOCUMENT APPROVAL FLOW | STORE IMAGE DATA IN NON-FIXED FORMAT FOLDER OF FILE SERVER, AND ACCESS WORKFLOW SERVER TO START DOCUMENT CIRCULATION FLOW |

DOCUMENT PROCESSING APPARATUS AND DOCUMENT PROCESSING METHOD

BACKGROUND OF THE INVENTION

1. Field of the Invention

The present invention relates to a document processing apparatus which performs predetermined processing on image data generated by reading an original image, and a document processing method.

2. Description of the Related Art

Recently, various kinds of electronic data, and processing of the electronic data have come to be managed by a sharing server. Examples of the sharing server include a file server that stores and manages electronic data of electronic documents and the like, and a workflow management server that handles processes (for data registration, an approval flow, and an application flow, and so forth) performed on documents.

Particularly in the field of form processing, there has been proposed a technique in which an identifier is embedded in a sheet to be scanned, and is associated with such a process as mentioned above, and if the identifier is contained in an image scanned in by an apparatus, a predetermined process (document processing) set in advance is automatically started (see Japanese Patent Laid-Open Publication No. 2003-99700).

Further, there has also been proposed a technique of not only performing a predetermined processing on image data recognized to be of a business form but also further performing a specific processing on the image data in an auxiliary manner depending on contents of entry to the business form (see Japanese Patent Laid-Open Publication No. H11-110457).

Thus, the above-described techniques makes it possible for a document processing apparatus to perform a predetermined process set in advance on a fixed format, such as a business form, registered in advance in the apparatus, when the fixed format is scanned in.

However, the above-described conventional document processing apparatus suffers from the following problems: There is a case where the predetermined processing is desired to be executed on a document other than the fixed format registered in advance in the apparatus. As an example of the case, there may be mentioned a case in which contents to be entered in the fixed format are entered in a sheet other than a sheet of the fixed format. Let it be assumed, for example, that a meeting minutes form has been registered as the fixed format. The proper process is that a user prints out a fixed format sheet of this registered meeting minutes form, enters the details of a meeting in the sheet, and causes the sheet to be scanned in by the document processing apparatus, thereby causing the apparatus to execute predetermined processing set in advance in the apparatus. However, there also exists a situation in which the user cannot avoid using a sheet other than the fixed format sheet. For example, the user forgets to bring minutes forms into a meeting, and enters meeting minutes in sheets other than the fixed format sheets for entry of meeting minutes. Further, for example, the amount of the whole meeting minutes is more than can be entered in one meeting minutes form, so that he/she enters a continued part of the details in a sheet other than the fixed format sheet of the meeting minutes form.

In the above-described cases, it is impossible for the above-described conventional document processing apparatus to perform the processing set in advance on a sheet other than the fixed format sheet.

SUMMARY OF THE INVENTION

The present invention provides a document processing apparatus and method which makes it possible to cause predetermined processes to be performed using sheets of one fixed format, in both of the case of scanning a fixed format sheet which has a description entered therein and the case of scanning a sheet which has a description entered therein but is other than the fixed format sheet.

In a first aspect of the present invention, there is provided a document processing apparatus comprising a reading unit configured to read an original image to thereby generate image data, a recognition unit configured to recognize whether or not the original image read by the reading unit is of a specific format, a determination unit configured to be operable when the recognition unit recognizes that a first original image read by the reading unit is of a specific format, to determine whether or not the first original image is of the specific format having an entry made thereto, a first processing unit configured to be operable when the determination unit determines that the first original image is of the specific format having an entry made thereto, to perform a first processing associated with the specific format on first image data generated by the reading unit by reading the first original image, and a second processing unit configured to perform a second processing associated with the specific format on second image data generated by the reading unit by reading a second original image in association with the first original image, the second original image being not recognized by the recognition unit to be of the specific format.

In a second aspect of the present invention, there is provided a document processing method executed by a document processing apparatus, comprising reading an original image to thereby generate image data, recognizing whether or not the original image read by the reading is of a specific format, determining, when it is recognized by the recognition that a first original image read by the reading is of a specific format, whether or not the first original image is of the specific format having an entry made thereto, performing, when it is determined by the determination that the first original image is of the specific format having an entry made thereto, a first processing associated with the specific format on first image data generated by the reading by reading the first original image, and performing a second processing associated with the specific format on second image data generated by the reading by reading a second original image in association with the first original image, the second original image being not recognized by the recognition to be of the specific format.

In a third aspect of the present invention, there is provided a computer-readable storage medium which stores a control program for causing a computer to execute a document processing method executed by a document processing apparatus, wherein the document processing method comprises reading an original image to thereby generate image data, recognizing whether or not the original image read by the reading is of a specific format, determining, when it is recognized by the recognition that a first original image read by the reading is of a specific format, whether or not the first original image is of the specific format having an entry made thereto, performing, when it is determined by the determination that the first original image is of the specific format having an entry made thereto, a first processing associated with the specific format on first image data generated by the reading by reading the first original image, and performing a second processing associated with the specific format on second image data generated by the reading by reading a second original image in association with the first original image, the second original image being not recognized by the recognition to be of the specific format.

According to the present invention, when it is determined that a specific format sheet has an entry made thereto, a first processing is performed on image data thereof. On the other hand, a second processing associated with the specific format is performed on second image data of a second original image read in association with the first original image, the second original image being not recognized to be of the specific format. This makes it possible to cause the predetermined processings to be performed using sheets of one fixed format, in both of the case of scanning a fixed format sheet which has a description entered therein and the case of scanning a sheet which has a description entered therein but is other than the fixed format sheet. As a consequence, it is possible to improve user's convenience.

The features and advantages of the invention will become more apparent from the following detailed description taken in conjunction with the accompanying drawings.

BRIEF DESCRIPTION OF THE DRAWINGS

FIG. 8 is a view showing an example of a fixed format used as a meeting minutes form.

FIG. 9 is a view showing a fixed format processing information table stored in the multifunction machine in a manner associated with fixed format information, a first document processing process, and a second document processing process.

DETAILED DESCRIPTION OF THE EMBODIMENTS

The present invention will now be described in detail below with reference to the accompanying drawings showing embodiments thereof. The present embodiment shows a case in which the present invention is applied to a multifunction machine as a document processing apparatus.

Figure 1:
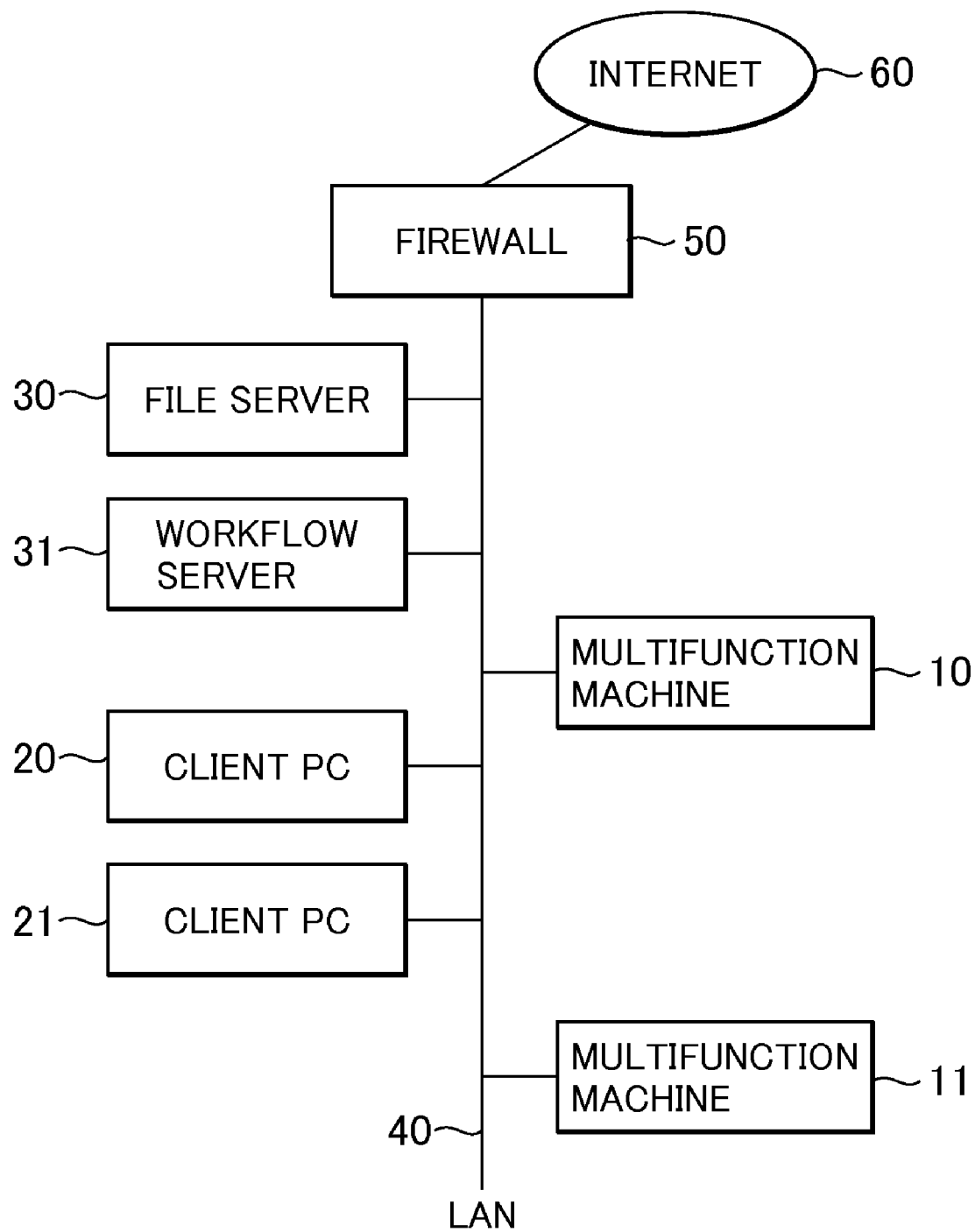
FIG. 1 is a view of the configuration of a document processing system including a multifunction machine as a document processing apparatus according to a first embodiment of the present invention.

FIG. 1 is a view showing the configuration of a document processing system image including the multifunction machine as the document processing apparatus according to a first embodiment of the present invention. The document processing system is comprised of a file server 30, a workflow server 31, client PCs 20 and 21 as examples of an information processing apparatus, and multifunction machines 10 and 11 as examples of the document processing apparatus, all of which are connected to a LAN 40. A firewall 50 connects between the inside of the LAN 40 and the Internet 60 as an external communication network, and performs security management and the like.

The file server 30 accumulates data such that a plurality of users connected via the LAN 40 can share the data. Now, the term "data" is intended to mean various information, such as electronic documents and image files, which are handled on computers. The file server 30 performs processing for transmitting and receiving electronic documents between devices, and control of access to electronic documents, for example.

The workflow management server (workflow server) 31 for electronic documents provides workflows for processes for approval, signature, circulation, and application filing, which are performed between a plurality of users. For example, the workflow server 31 performs configuration of various settings of the workflows, and monitors processed statuses of the electronic documents.

The client PCs 20 and 21 are used by users so as to perform various kinds of operations, including creation of a fixed format, accessing the server, and giving print instructions to the multifunction machines. The multifunction machines 10 and 11 have main functions of inputting and outputting images, including scanning (reading) and printing of the images.

For example, in the present embodiment, the client PCs 20 and 21 register information concerning fixed formats in the multifunction machines 10 and 11, and give print instructions. Further, the multifunction machines 10 and 11 performs document processing on scanned (read) image data according to the registered information. In this connection, depending on the type of the document processing, the multifunction machines themselves become clients to access the file server 30 and the workflow server 31 to thereby execute predetermined processing on data.

Figure 2:
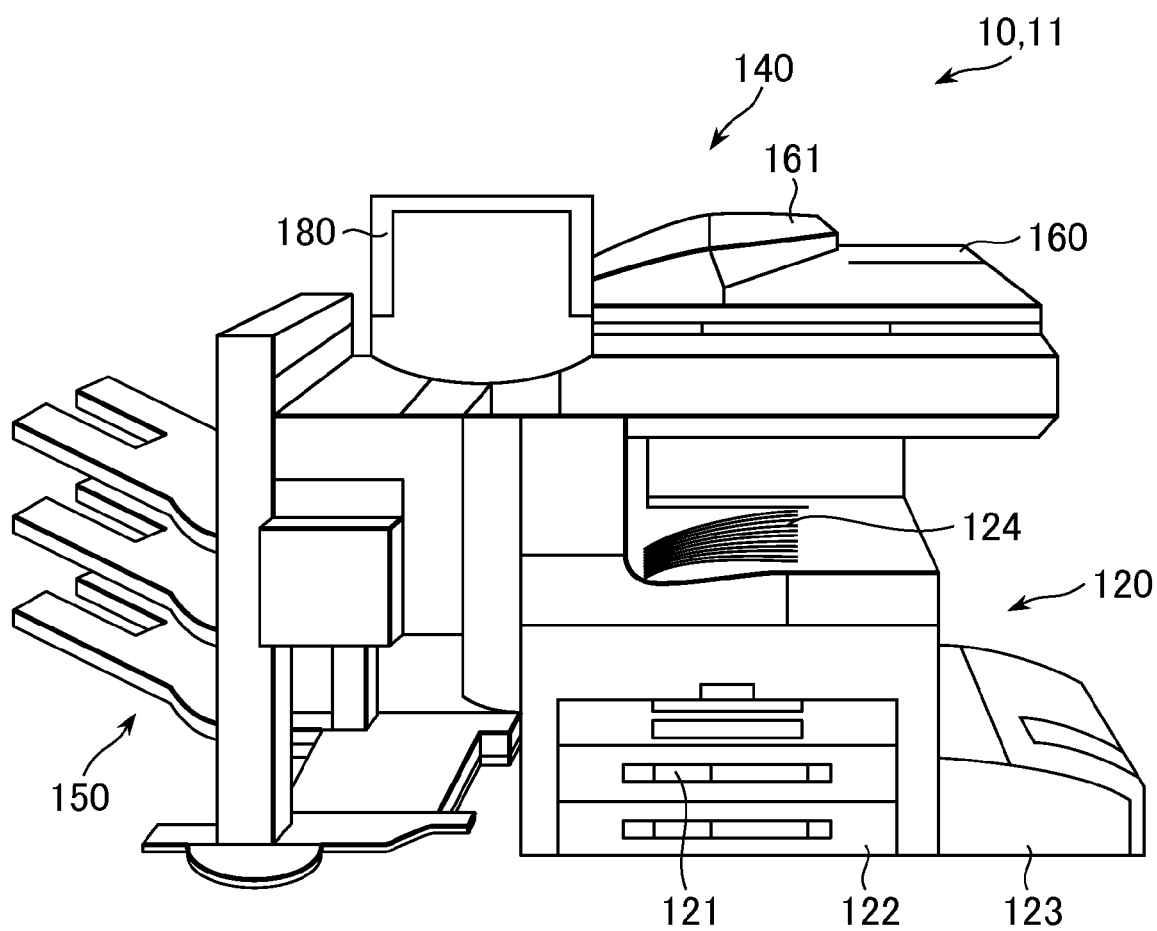
FIG. 2 is a perspective view of the appearance of the multifunction machine.

FIG. 2 is a perspective view of the appearance of each of the multifunction machines 10 and 11. The multifunction machines 10 and 11 have the same construction, and are each mainly comprised of a scanner section 140, a printer section 120, an operating section 180, and a finisher section 150. Since the multifunction machines 10 and 11 have the same construction as mentioned above, the multifunction machine 11 performs processing in the same manner as the multifunction machine 10, though only processing by the multifunction machine 10 is described hereafter.

The scanner section 140 inputs reflected light that is obtained by performing exposure scanning of an image on an original, to a CCD (Charge Coupled Device), thereby converting image information into an electric signal. Further, the scanner section 140 converts the electric signal into respective luminance signals of red (R), green (G), and black (B)

colors, and outputs the luminance signals to a controller 100 (see FIG. 3), described hereinafter, as image data.

In the scanner section 140, originals are set on a tray 161 of a document feeder 160. When the user instructs the start of scanning the originals, from the operating section 180, the controller 100 transmits an image scanning instruction to the scanner section 140. Upon reception of the instruction, the scanner section 140 feeds the originals from the tray 161 of the document feeder 160 one by one, and performs original scanning operations. The originals may be scanned in not by the automatic feed method using the document feeder 160, but by a method in which the originals are each manually placed one by one on a platen glass (not shown) of the scanner section 140, and are scanned by moving an exposure unit (not shown).

The printer section 120 is an image forming device for forming images on sheets based on image data received from the controller 100. In the present embodiment, electrophotography which uses a photosensitive drum or a photosensitive belt is employed as an image forming method. Further, the printer section 120 is provided with a plurality of sheet cassettes 121, 122, and 123 that make it possible to select between different sheet sizes, and between different sheet orientations. Printed sheets are discharged onto a discharge tray 124.

Figure 3:
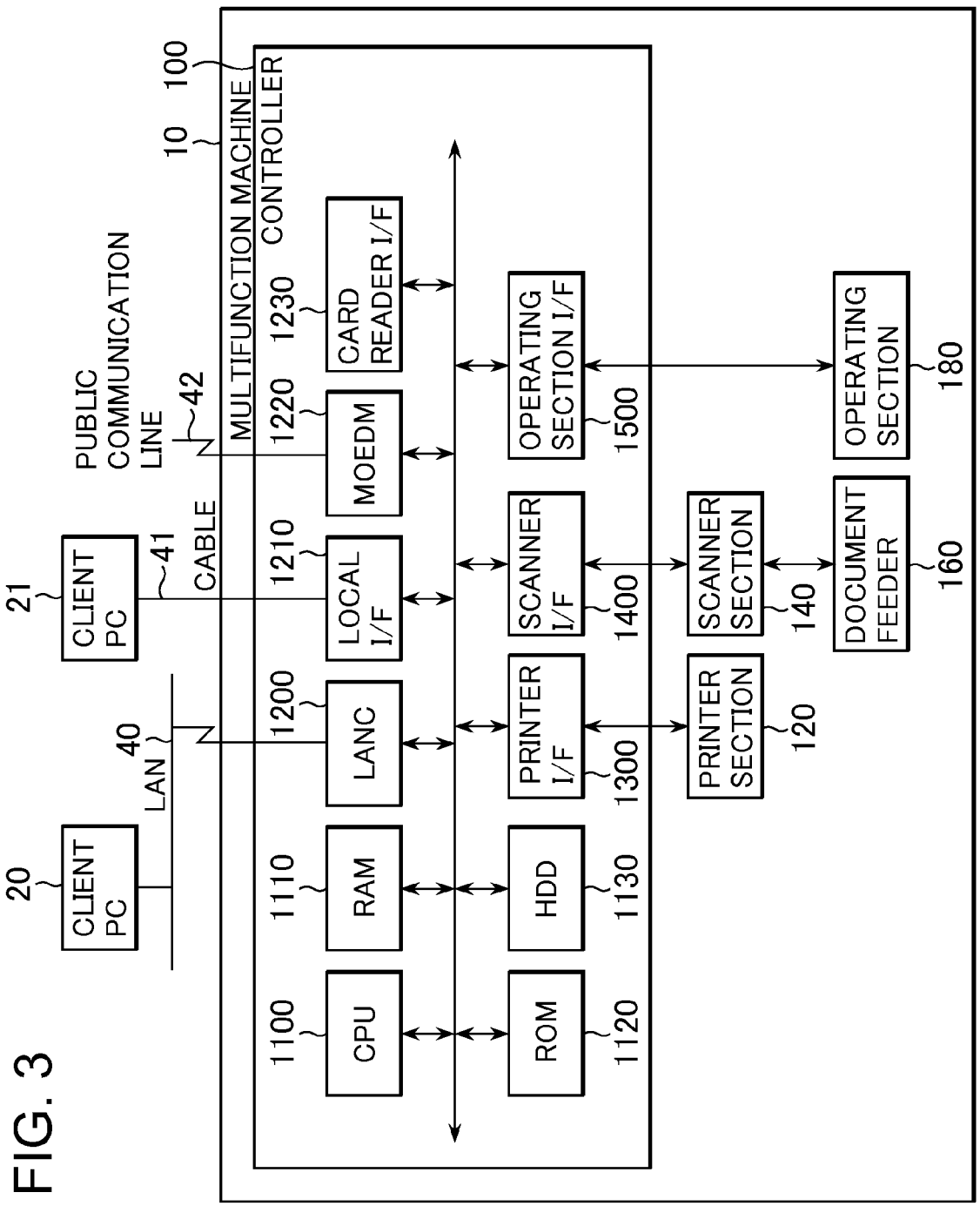
FIG. 3 is a block diagram showing the hardware configuration of the multifunction machine including a controller.

FIG. 3 is a block diagram showing the hardware configuration of the multifunction machine including the controller 100. The controller 100 is connected not only to the scanner section 140, which is an image input device, and the printer section 120, which is an image output device, but also to the LAN 40 and a public communication line (WAN) 42, for inputting and outputting image information and device information.

The controller 100 includes a CPU 1100, a RAM 1110, a ROM 1120, an HDD 1130, a LANC 1200, a printer interface 1300, and a scanner interface 1400. Further, the controller 100 includes an operating section interface 1500, a local interface 1210, a modem 1220, and a card reader interface 1230.

The CPU 1100 serves as a processor for controlling the whole system, and performs centralized control of access to various kinds of devices connected to the system based on control programs and the like stored in the ROM 1120. Further, the CPU 1100 also performs centralized control of various kinds of processing performed within the controller (also referred to as "the controller unit") 100.

The RAM 1110 serves as a system work memory used by the CPU 1100 for operation thereof, and also serves as an image memory for temporarily storing image data. The ROM 1120 is a boot ROM, which stores a boot program for the system.

The hard disk drive (HDD) 1130 mainly stores system software and image data. Out of the contents of the HDD 1130, such as the system software and image data stored therein, details of those contents associated with the present invention will be described hereafter.

Figure 4:
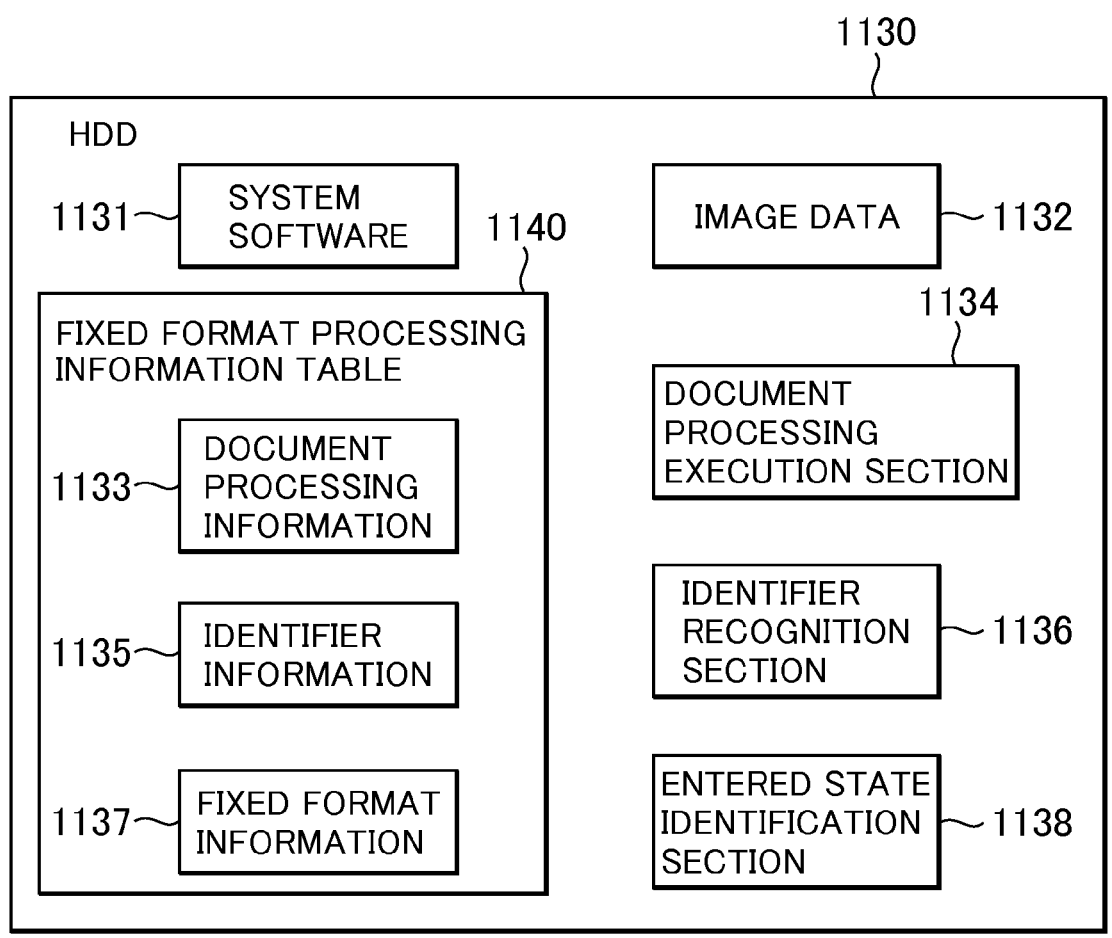
FIG. 4 is a view of contents stored in a hard disk drive (HDD).

FIG. 4 is a view of the above contents stored in the hard disk drive (HDD) 1130. The HDD 1130 stores system software 1131, image data 1132, a fixed format processing information table 1140 (document processing information 1133, identifier information 1135, and fixed format information 1137), a document processing execution section 1134, an identifier recognition section 1136, and an entered state identification section 1138. It should be noted that the document processing execution section 1134, the identifier recognition section 1136, and the entered state identification section 1138 are programs executed by the CPU 1100. The above data and programs may be stored not only in the HDD 1130 but also in another storage medium (not shown) which is capable of holding stored data even after the power is shut down.

The LANC 1200 is connected to the LAN 40, for inputting and outputting output image data and information concerning device control.

Further, the multifunction machine 10 receives output image data from the client PC 20 and an output image data management device (not shown) on the network, according to an input operation by the operating section 180, and outputs images.

The local interface 1210 includes e.g. a USB and a centronics interface, and is connected to the client PC 21 and a printer, not shown, via a cable 41, for inputting and outputting of data.

The modem 1220 is connected to the public communication line 42, for inputting and outputting of data. The card reader interface 1230 is an external interface which is capable of reading data from authentication cards, such as IC cards.

The printer interface 1300 is connected to the printer section 120, and interfaces communication with d a CPU, not shown, of the printer section 120 an. Further, the printer interface 1300 performs synchronous-to-asynchronous or asynchronous-to-synchronous conversion of image data. The scanner interface 1400 is connected to the scanner section 140, for performing communication with a CPU, not shown, of the scanner section 140. Further, the scanner interface 1400 performs synchronous-to-asynchronous or asynchronous-to-synchronous conversion of image data. The operating section interface 1500 interfaces with the operating section (user interface) 180, and outputs image data displayed on the operating section 180 to the operating section 180. Further, the operating section interface 1500 plays the role of transmitting information input from the operating section 180 by a user of the present system to the CPU 1100.

Figure 5:
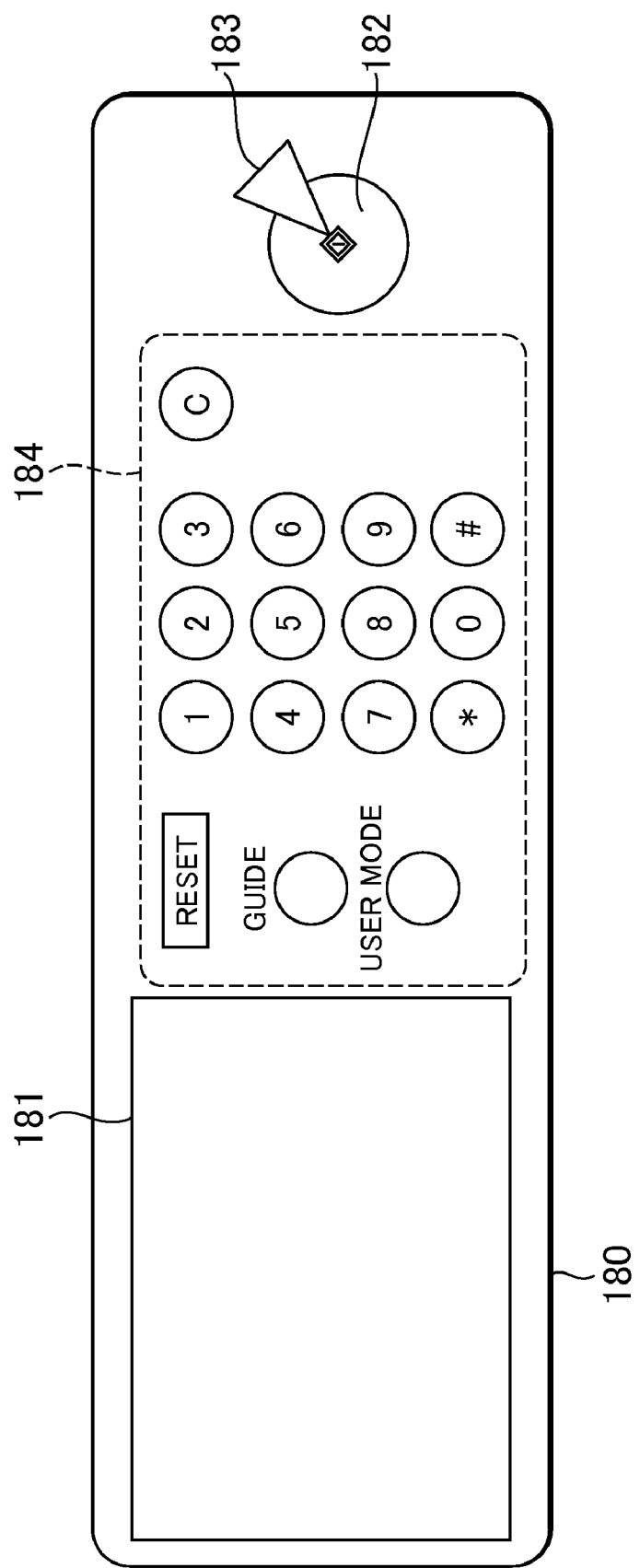
FIG. 5 is a view of the appearance of an operating section.

FIG. 5 is a view of the appearance of the operating section 180. The operating section 180 is provided with a liquid-crystal operation panel 181, a hard key group 184, a start key 182, and a stop key 183. The liquid-crystal operation panel 181 is formed by combining a liquid crystal and a touch panel, for displaying the operation screen of the system, and is configured such that when any of keys displayed on the operation screen is depressed, it transmits information on the depression of the key to the controller 100.

The start key 182 is used for instructing the multifunction machine 10 to start an operation selected from an original image scanning operation and other operations. The start key 182 is provided with LEDs of two colors, green and red. The green LED indicates that when it is lighted, the operation can be started, whereas the red LED indicates that when it is lighted, the operation cannot be started. The stop key 183 is for stopping the operation being executed. The hard key group 184 includes ten keys, a clear key, a reset key, a guide key, and a user mode key, none of which are specifically shown.

Figure 6:
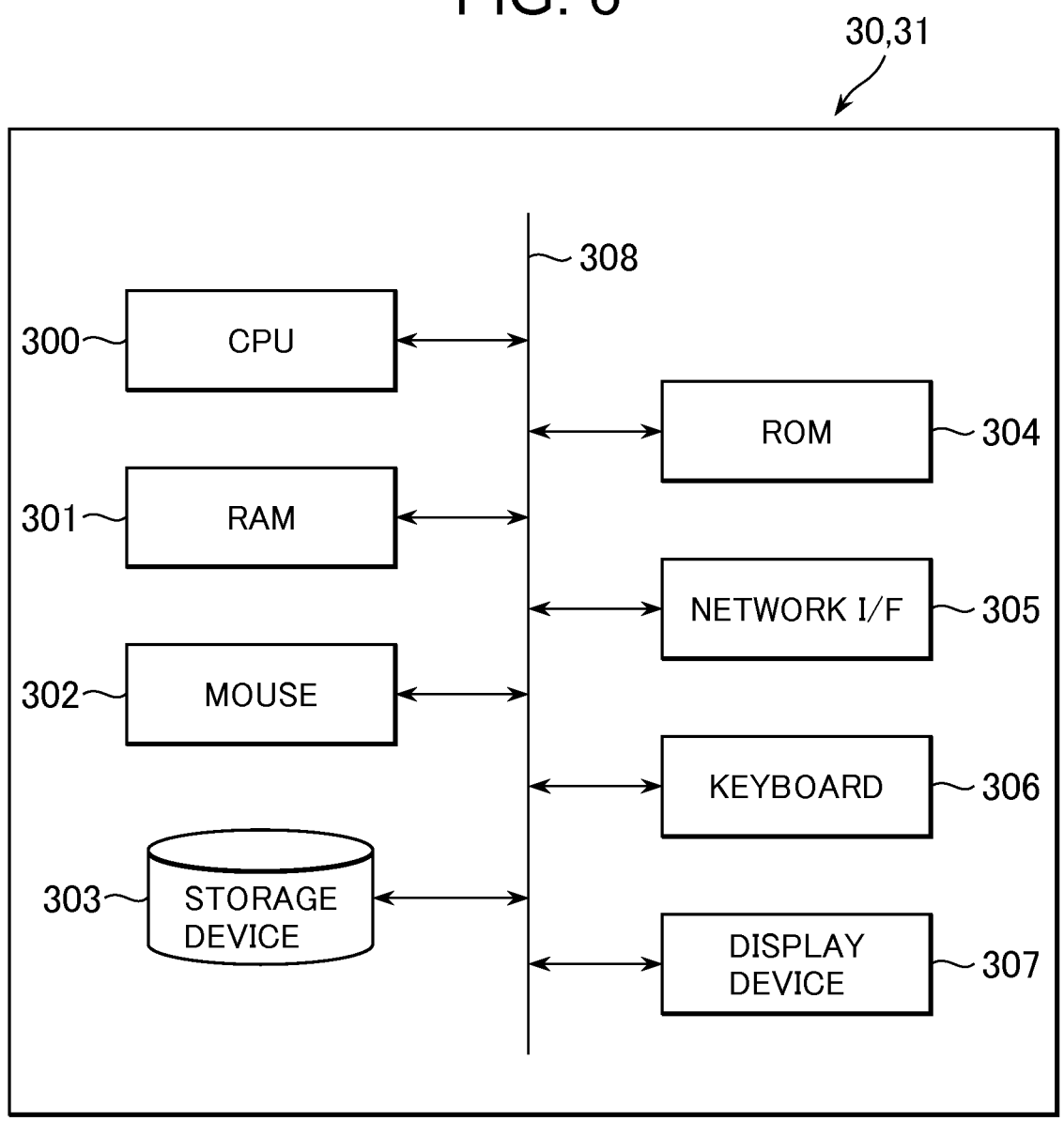
FIG. 6 is a block diagram showing the hardware configuration common to a file server and a workflow server.

FIG. 6 is a block diagram showing the hardware configuration common to the file server 30 and the workflow server 31. The file server 30 and the workflow server 31 have approximately the same configuration in which a CPU 300, a RAM 301, a ROM 304, a mouse 302, a storage device 303, a network interface 305, a keyboard 306, and a display device 307 are connected to each other via a bus 308.

The file server 30 and the workflow server 31 are connected to a network, such as the LAN 40 or the like, via the network interface 305, for performing data communication. The ROM 304 stores programs, such as a basic input output system (BIOS). The user inputs data and instructions via the keyboard 306 or the mouse 302 while viewing information displayed on the display device 307.

In the file server 30, data, such as various kinds of programs and document files, are stored in the storage device 303. Further, in the workflow server 31, data, such as various kinds of programs and files concerning workflows, are stored in the storage device 303.

The programs and data loaded from the storage device 303, or the data and instructions input from the keyboard 306 and the mouse 302 are stored in the RAM 301. The CPU (Central Processing Unit) 300 controls the above-mentioned sections connected to the bus 308, and performs processing in response to the instructions.

The storage device 303 is a nonvolatile data storage device, such as a hard disk, a magnetic tape, and a semiconductor memory, and stores various kinds of data required to be held even after the power of the file server 30 or the workflow server 31 is shut down. The storage device 303 stores files managed by the file server 30 and the workflow server 31, and information to be managed as contents of a database. The client PCs 20 and 21 also basically have the same hardware configuration as the file server 30 and the workflow server 31.

Figure 7:
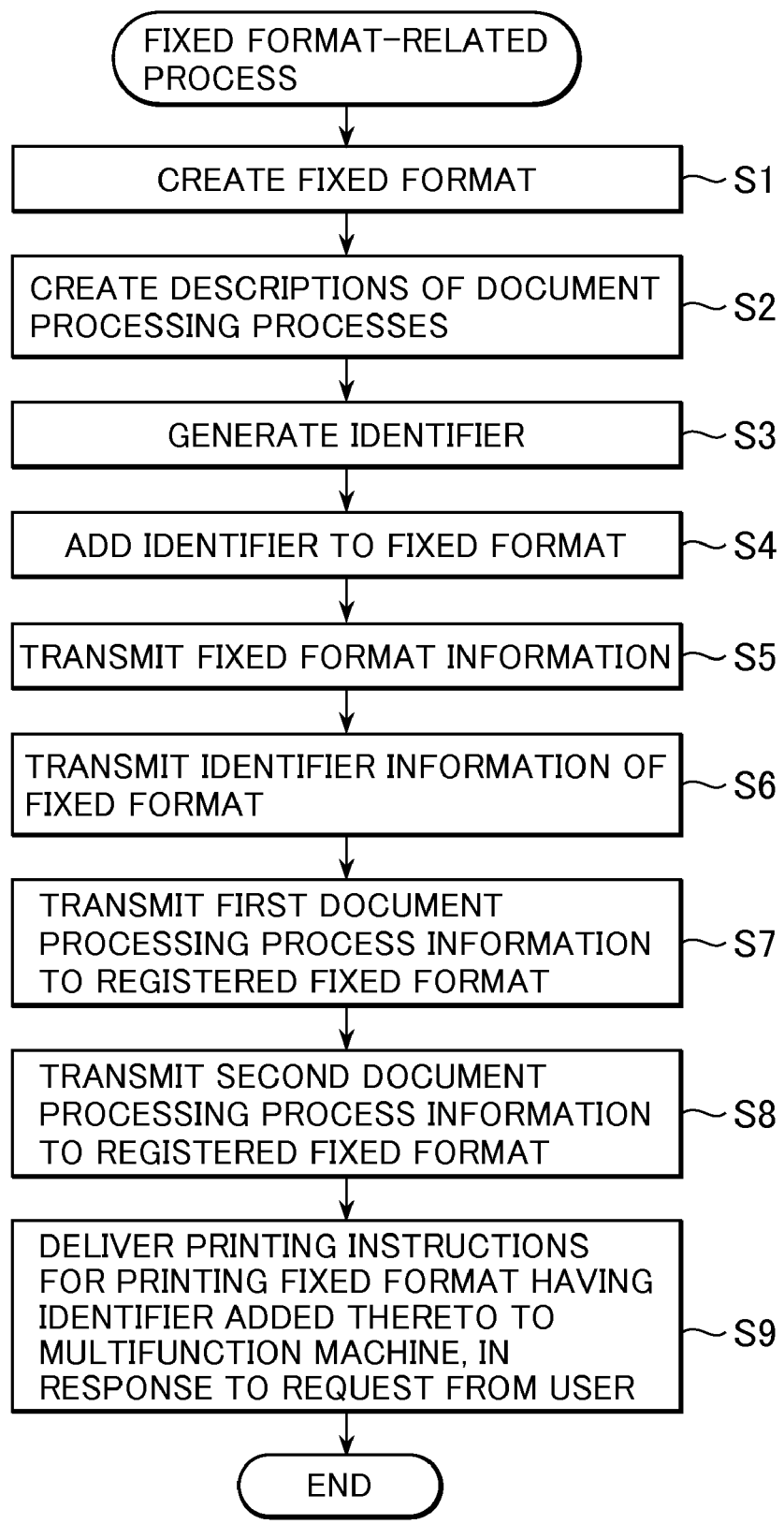
FIG. 7 is a flowchart of a fixed format-related process carried out by a client PC.

FIG. 7 is a flowchart of a fixed format-related process carried out by a client PC as the information processing apparatus. A program for the fixed format-related process is stored in a storage device, not shown, of the client PC 20 or 21, and is executed by a CPU, not shown, of the client PC 20 or 21. Although in the following, a description will be given assuming that the fixed format-related process in FIG. 7 is executed by the CPU of the PC 20, there is no problem in interpreting the description by assuming that the fixed format-based document processing is executed by a CPU, not shown, of the PC 21.

First, the client PC 20 creates a fixed format in response to an instruction from the user (step S1). The fixed format is created e.g. using any of a document creation application, a spreadsheet application, and the like, which are installed in the PC 20. The client PC 20 creates respective descriptions of a first document processing process and a second document processing process which are desired to be executed when a fixed format is scanned in by the multifunction machine (step S2).

Further, the client PC 20 generates an identifier for identifying the fixed format (step S3), and adds the generated identifier to the fixed format (step S4).

The client PC 20 transmits the information of the created fixed format to the multifunction machines 10 and 11 (step S5) and transmits the information of the identifier added to the fixed format to the multifunction machines 10 and 11 (step S6).

Furthermore, the client PC 20 transmits the description of the first document processing process associated with the identifier to the multifunction machines 10 and 11 (step S7), and transmits the description of the second document processing process associated with the same to the multifunction machines 10 and 11 (step S8). By receiving these pieces of information, the multifunction machines 10 and 11 are each capable of realizing document processing to be executed when the fixed format is scanned in.

The client PC 20 gives printing instructions in response to a demand from the user so as to cause a required number of fixed format sheets (templates) having the identifier added thereto to be printed out by the multifunction machine 10 or 11 (step S9). After that, the client PC 20 terminates the present processing.

As described hereinabove, it is possible to create various kinds of information using the client PC, which improves user's convenience. Although in the present embodiment, the case is shown in which the fixed format, the identifier, and the description of each document processing process are created by the client PC, if the system is configured such that the fixed format, the identifier, and the description of the document processing process can be created using the multifunction machine, they may be created by the multifunction machine.

FIG. 8 is a view showing an example of a fixed format of sheets for recording meeting minutes, in the present embodiment. The completed fixed format 70 includes boxes for entering hand-written characters, descriptions for explicitly indicating contents to be entered, and an identifier 71. Now, each sheet of the fixed format sheet having the identifier 71 embedded therein is referred to as the "template".

The identifier 71, which is format-specific information for identifying the type of the fixed format, is disposed in an inconspicuous location of the fixed format 70. The identifier 71 is not limited to a barcode or the like, but any suitable two-dimensional code, such as a QR code (registered trademark), and a graphic, a character string, and a numeric string, which are associated with the fixed format, may be used as the identifier 71 insofar as they enable identification of the fixed format by the multifunction machines.

FIG. 9 is a view showing the fixed format processing information table 1140 stored in the multifunction machines 10 and 11 in a manner associating identifier information, fixed format information and first and second document processing processes with each other. The fixed format processing information table 1140 is stored in the HDD 1130. The identifier information contains data necessary for identifying identifier information, such as identifier information items 801 and 802 which is extracted from the fixed format by the multifunction machine.

Each item of the identifier information 1135 is associated with specific fixed format information 1137, and the description of the first and second document processing processes (document processing information) 1133. Each item of the fixed format information 1137 comprises pointer information indicative of the start address of a memory area storing image data of a fixed format, and information for specifying handwriting areas.

Now, the information for specifying handwriting areas is, for example, information on handwriting areas A, B, and C, shown in FIG. 9, i.e. information on the respective horizontal coordinates ranges of the handwriting areas and the respective vertical coordinates ranges of the same. As the information indicative of each of the horizontal coordinates ranges and vertical coordinates ranges, there are stored a set of coordinates of a start point and coordinates of an end point (start coordinates and end coordinates) for each range.

Further, the number of the handwriting areas is not limited to the three of A, B, and C, as in the case of FIG. 9, but any number of handwriting areas may be set on an identifier information-by-identifier information basis. The multifunction machine assigns coordinates to a fixed format scanned in thereby and compares the aforementioned information of the coordinates ranges with the assigned coordinates to thereby identify the handwriting areas. Then, based on the information on the fixed format and the handwriting areas associated with each other, the multifunction machine executes the first and second document processing processed when a fixed format sheet is scanned in.

Figure 10:
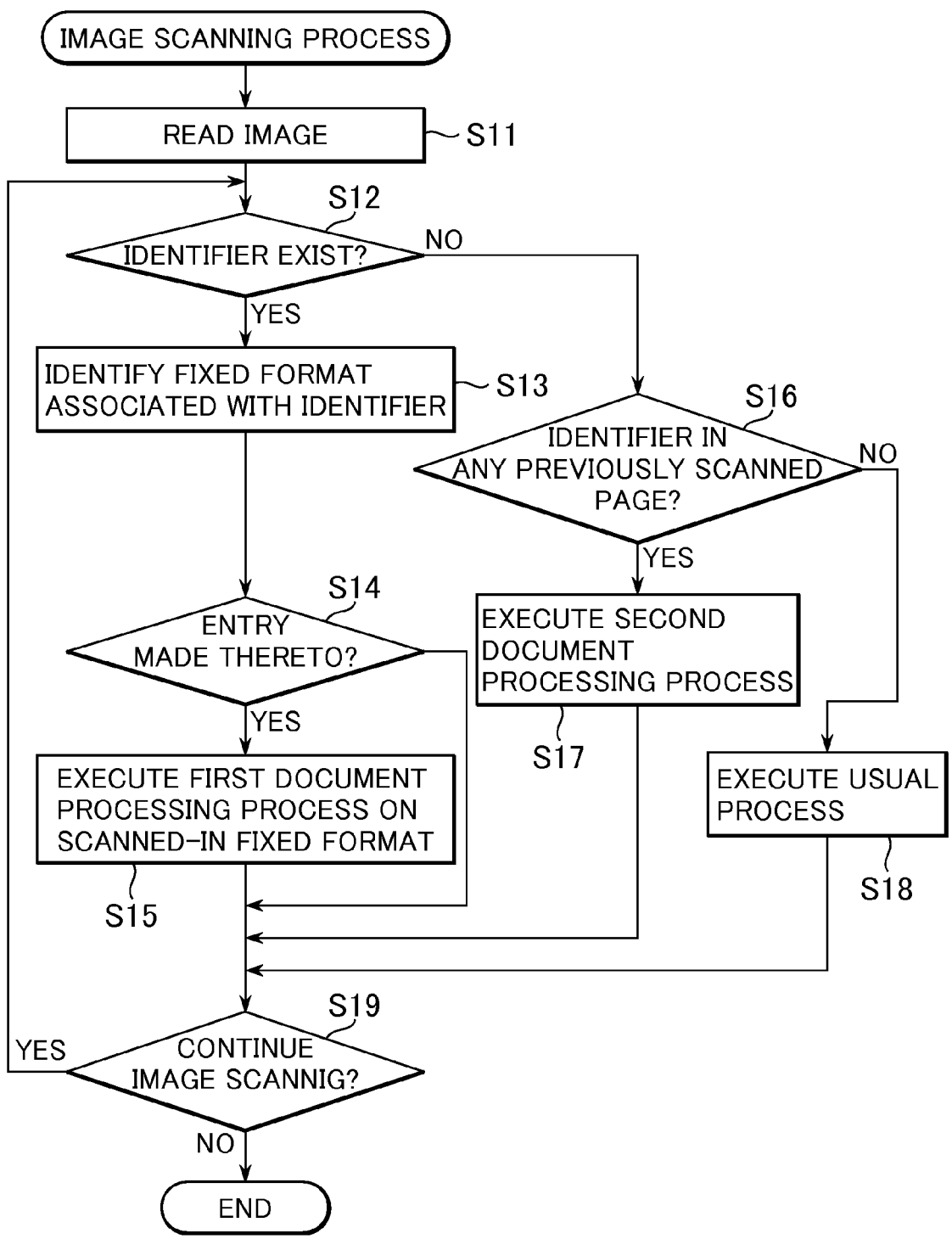
FIG. 10 is a flowchart of an image scanning process carried out by the multifunction machine.

FIG. 10 is a flowchart of an image scanning process carried out by the multifunction machine. A program for the image scanning process is stored in the HDD 1130 of the controller 100, and is executed by the CPU 1100.

First, the multifunction machine 10 scans in an image (step S11). The user sets an original (or a plurality of originals) desired to cause the multifunction machine to scan in, on the tray 161 of the document feeder 160 of the scanner section 140, and depresses the start key 182 of the operating section 180, whereby the multifunction machine 10 executes an image scanning operation.

The multifunction machine 10 determines whether or not the scanned original has an identifier (step S12). Determination of whether or not the scanned original has an identifier is carried out by the identifier recognition section 1136 by referring to the identifier information 1135 stored in the HDD 1130.

If it is determined that the scanned original has no identifier, the multifunction machine 10 determines whether or not any previously scanned page has an identifier (step S16). Now, the term "any previously scanned page" is intended to mean "any of all the pages from a first page scanned in at the start of the present image scanning process to a page immediately preceding the page currently scanned in". Therefore, when the first page is scanned in, it is necessarily determined in the step S16 that no previously scanned pages have an identifier. If it is determined that no previously scanned pages have an identifier, the multifunction machine 10 performs a usual process on the original currently scanned in by the present image scanning process (step S18). Here, the term "usual process" indicates a process, such as copying, which has been set by the user via the operating section 180.

On the other hand, if it is determined in the step S16 that some previously scanned page has an identifier, the multifunction machine 10 performs the second document processing process (step S17). The second document processing process is executed by the document processing execution section 1134 based on the document processing information 1133 stored in the HDD 1130. The second document processing process is performed on image data (second image data) obtained by scanning in an image (hereinafter referred to as "the second original image") on an original with no identifier, scanned-in in association with an image (hereinafter referred to as "the first original image") on a previously scanned original with an identifier. As described above, the second processing is carried out on image data of the second original image with no identifier which is scanned in association with the scanning-in of first image data recognized to have an identifier. Then, after completion of the steps S17 and S18, the present process proceeds to a step S19.

On the other hand, if it is determined in the step S12 that the scanned original has an identifier, the multifunction machine 10 identifies a fixed format associated with the identified identifier (step S13). This enables the multifunction machine 10 to recognize that the original scanned in the step S11 is in a specific fixed format. This fixed format is identified by referring to the fixed format information 1137 stored in the HDD 1130.

The multifunction machine 10 determines whether or not the scanned fixed format sheet has an entry made to a to-be-entered item (step S14). Determination of whether or not an entry has been made is performed by the entered state identification section 1138, based on the fixed format information 1137 stored in the HDD 1130.

In the present embodiment, as described hereinabove with reference to FIG. 9, coordinate information for identifying areas in which entries are to be made by handwriting is contained in the fixed format information 1137 stored in the HDD 1130. Therefore, after identifying the fixed format from the scanned identifier, it is determined whether or not the areas indicated by the coordinate information contain images, whereby it is determined whether or not entries have been made in the areas. In this case, it is envisaged to judge that an entry has been made when the density level of an identified handwriting area is not smaller than a predetermined threshold value, or when a character is recognized in the handwriting area using an OCR (optical character recognition) function.

Now, the operation in the step S14 will be described by taking the FIG. 9 fixed format processing information table 1140 as an example. First, let it be assumed that from the identifier of the scanned fixed format sheet, "ABCD0001" 801 is identified as the identifier information 801. By referring to the fixed format information 1137 associated with the identifier information "ABCD0001" of the fixed format processing information table 1140, it is known that there are three handwriting areas A, B, and C in the scanned fixed format sheet. Then, rectangular areas in the scanned fixed format sheet are identified which correspond to the handwriting areas each defined by the horizontal coordinates range and the vertical coordinates range thereof. Then, the entered state identification section 1138 performs judgment of an entered state of each identified area.

Whether or not the entries have been made may be determined by the following other method: The entered state identification section 1138 compares data of an image scanned from the fixed format sheet and image data of a fixed format designated by the start address of a memory area storing the image data, which is contained in the fixed format information 1137 stored in the HDD 1130. If the results of the comparison show that there is no difference between the image data, the entered state identification section 1138 determines that the scanned fixed format sheet has no entry made thereto. On the other hand if there is an image found only on the scanned fixed format sheet, it determines the scanned fixed format sheet has an entry made thereto. In this case, it is envisaged to compare the density level of the scanned fixed format sheet with the density level which may be defined in the fixed format information 1137 stored in the HDD 1130, and if there is a difference not smaller than a predetermined threshold value, it is determined that an entry has been entered.

If it is determined in the step S14 that the scanned fixed format sheet has an entry made thereto, the multifunction machine 10 executes the first document processing process on the scanned fixed format sheet (step S15). The first document processing process is executed by the document processing execution section 1134 based on the document processing information 1133 stored in the HDD 1130. Then, the multifunction machine 10 proceeds to a step S19. If it is determined in the step S14 that the scanned fixed format sheet has no entry made thereto, the multifunction machine 10 directly proceeds to the step S19.

The multifunction machine 10 determines whether or not to continuously perform the scanning process on the next original following the currently scanned original (step S19). For example, assuming that the user sets originals on the tray 161 of the document feeder 160 of the scanner section 140, it is determined whether or not to continuously perform the scanning process on the next original, by determining whether or not there still remains any original on the tray 161.

Further, when the user sets originals on the surface of the platen glass of the scanner section 140, it is possible to perform the determination by determining which timing the user depressed a "scan end" button displayed on the liquid-crystal operation panel 181 of the operating section 180. If any original scanned in before depression of the "scan end" button has not been processed yet, the answer to the question of the step S19 becomes affirmative (YES), and hence the image scanning process is continuously performed on the next original.

Figure 11:
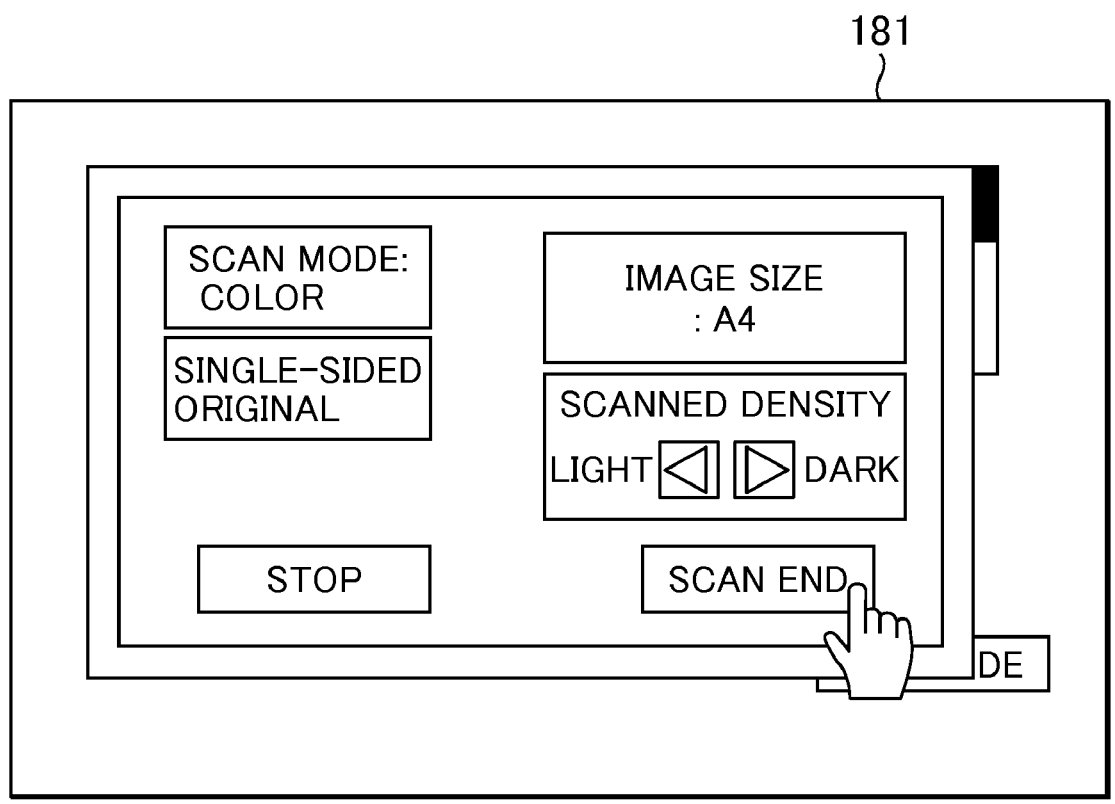
FIG. 11 is a view of the appearance of a display screen of a liquid-crystal operation panel.

FIG. 11 is a view of a screen displayed on the liquid-crystal operation panel 181. When the originals are set on the platen glass of the scanner section 140 and the multifunction machine 10 executes the image scanning operation in the step S11, the screen shown in FIG. 11 is displayed. On this screen, a large number of buttons including the "scan end" button and a "stop" button, and information concerning the image scanning process are displayed. It is assumed here that after causing all the originals desired to be scanned to be scanned by the multifunction machine, the user depresses the "scan end" button as illustrated in FIG. 11. This causes the multifunction machine 10 to proceed from the step S11 to the step S12.

If it is determined in the step S19 that the image scanning process is to be continuously performed on the next original, the multifunction machine 10 returns to the step S12 to continuously perform the image scanning process on the next original. On the other hand, if it is determined in the step S19 that the image scanning process is not to be continuously performed on the next original, the multifunction machine 10 terminates the present image scanning process.

With the above-described configuration of the image scanning process, if a fixed format sheet having an entry made thereto is scanned in, the multifunction machine 10 executes the first document processing process. Further, in a case where a fixed format sheet has been previously scanned in, if a sheet other than the fixed format sheet is scanned in, the multifunction machine 10 executes the second document processing process. Further, in a case where no fixed format sheet has been previously scanned in, if a sheet other than the fixed format sheet is scanned in, the multifunction machine 10 executes the usual process.

Next, a description will be given, by way of example, of first and second document processing processes which are defined in association with identifier information ABCD0002 denoted by reference numeral 802 in the FIG. 9 fixed format processing information table and are executed using the FIG. 8 fixed format sheet for recoding meeting minutes. In the first document processing process, the multifunction machine 10 extracts image data from the boxes for the respective items (date, entry person, and description of meeting minutes) of the scanned fixed format, and transmits the image data to the file server 30 so as to cause the same to be stored in a minutes format-storing folder in the storage device 303 of the file server 30. Further, the multifunction machine 10 passes the image data of the scanned fixed format to the workflow server 31, to thereby cause the workflow server 31 to start a minutes circulation workflow process. It should be noted that as described above, the first document processing process is defined in a manner associated with the identifier information 1135 and the fixed format information 1137 in the fixed format processing information table 1140 stored in the HDD 1130 (see the first document processing process associated with identifier information ABCD0002 denoted by reference numeral 802 in FIG. 9).

In the second document processing process, the multifunction machine 10 pastes (attaches) a description of meeting minutes extracted from the scanned-in sheet in the image scanning process to a box for the description of minutes in a fixed format (minutes format in the present case) stored therein. Further, the multifunction machine 10 has the date and the entry person name entered in respective entry boxes by the user via the operating section 180, and transmits completed data to the file server 30 to cause the data to be stored in the minutes format-storing folder of the storage device 303 of the file server 30. Furthermore, the multifunction machine 10 passes the image data to the workflow server 31 to cause the workflow server 31 to start the minutes circulation workflow process. It should be noted that as described hereinbefore, above, this second document processing process as well is defined in a manner associated with the identifier information 1135 and the fixed format information 1137 in the fixed format processing information table 1140 stored in the HDD 1130 (see the second document processing process associated with the identifier information ABCD0002 denoted by reference numeral 802 in FIG. 9).

As described heretofore, according to the document processing apparatus of the first embodiment, it is possible to cause a predetermined process to be performed using sheets of one fixed format, in both of the case of scanning a fixed format sheet which has a description entered therein and the case of scanning a sheet which has a description entered therein but is other than the fixed format sheet. This makes it possible to improve user's convenience. For example, even when the entire description of meeting minutes cannot be entered in the fixed format for recording minutes, and hence continued part of the description is entered in a sheet other than the fixed format sheet, it is possible to process the entries in the sheets as the meeting minutes by causing the multifunction machine to scan both of the sheets.

A document processing apparatus according to a second embodiment performs an image scanning process different from the image scanning process carried out by the document processing apparatus according to the first embodiment. The configuration and operation of the document processing apparatus other than the image scanning process are the same as those of the first embodiment.

Figure 12:
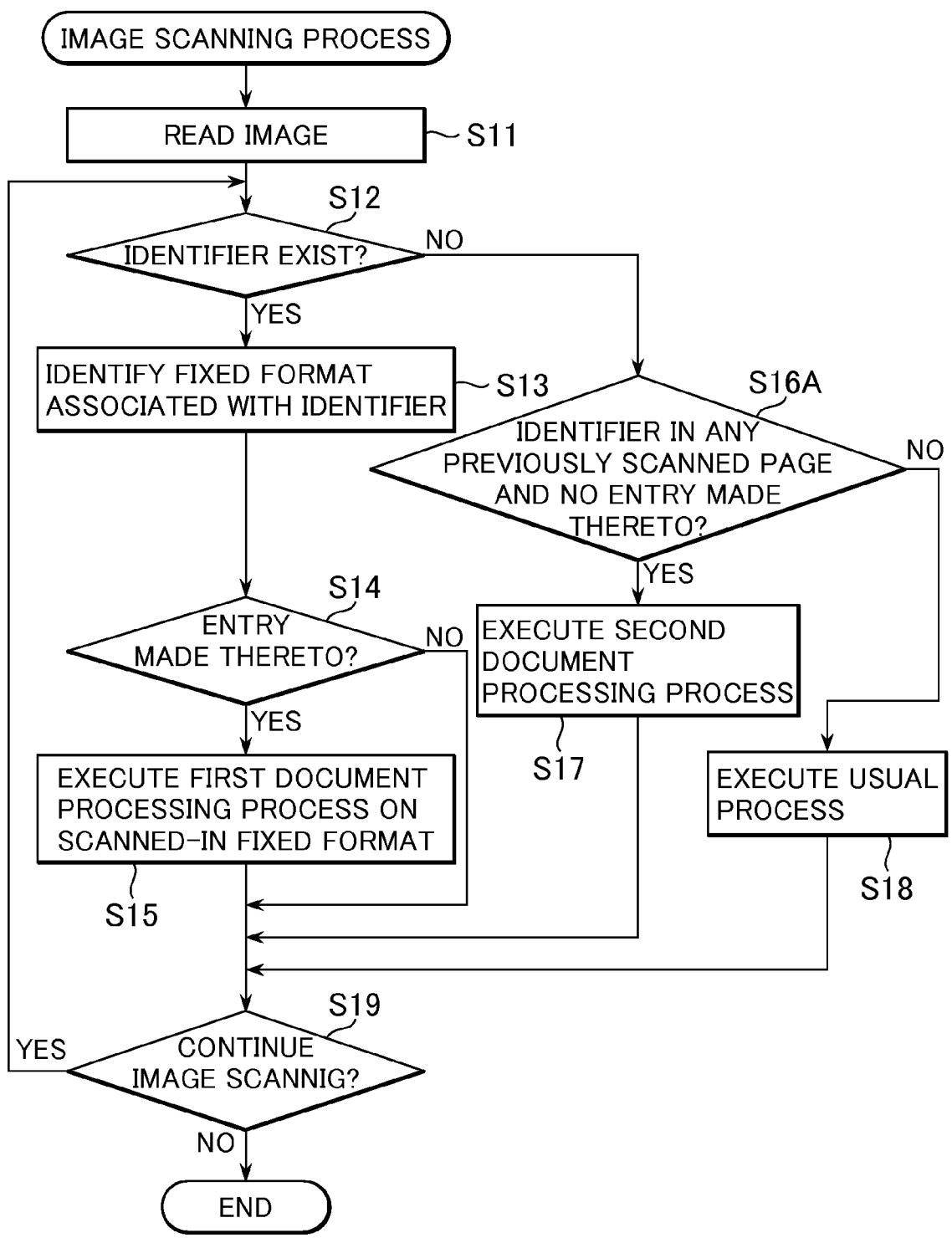
FIG. 12 is a flowchart of an image scanning process carried out by a multifunction machine as a document processing apparatus according to a second embodiment of the present invention.

FIG. 12 is a flowchart of the image scanning process carried out by the multifunction machine as the document processing apparatus according to the second embodiment. A program for the image scanning process is stored in the HDD 1130 of the controller 100, and is executed by the CPU 1100. Steps identical to those in the first embodiment are designated by identical step numbers, and description thereof is omitted.

If it is determined in the step S12 that the scanned original has no identifier, the multifunction machine 10 determines whether or not any previously scanned page has an identifier and at the same time has no entry made thereto (step S16A). If it is determined that no previously scanned pages have an identifier, or although some previously scanned page has an identifier but has an entry made thereto, the multifunction machine 10 performs the usual process on the original currently scanned in the present scanning process in the step S18. Now, the term "usual process" indicates a process, such as copying, which has been set by the user via the operating section 180.

On the other hand, if it is determined in the step S16A that some previously scanned page has an identifier, and at the same time has no entry made thereto, the multifunction machine 10 executes the second document processing process (step S17). This second document processing process is executed by the document processing execution section 1134 based on the document processing information 1133 stored in the HDD 1130.

After completion of the steps S17 and S18, the multifunction machine 10 determines whether or not to continuously perform the scanning process on the next original following the currently scanned original (step S19). If it is determined that the image scanning process is to be continuously performed on the next original, the multifunction machine 10 returns to the step S12 to continuously perform the image scanning process on the next original.

On the other hand, if it is determined in the step S19 that the image scanning process is not to be continuously performed on the next original, the multifunction machine 10 terminates the present image scanning process.

With the above-described configuration of the image scanning process, if a fixed format sheet having an entry made thereto is scanned in, the multifunction machine 10 executes the first document processing process. Further, in a case where a fixed format sheet having no entry made thereto has been previously scanned in, if a sheet other than the fixed format sheet is scanned in, the multifunction machine 10 executes the second document processing process. Further, in a case where no fixed format sheet has been previously scanned in or in a case where a fixed format sheet having an entry made thereto has been previously scanned in, if a sheet other than the fixed format sheet is scanned in, the multifunction machine 10 executes the usual process.

According to the document processing apparatus of the second embodiment, the fixed format sheet having no entry made thereto can be used as a template for causing the second document processing process to be performed on contents entered in a sheet other than the fixed format sheet. For example, even when no fixed format sheet for entry of meeting minutes is at hand and a description of minutes is entered in a sheet other than the fixed format sheet, it is possible to cause execution of the same processing as executed when a description of the minutes is entered in the fixed format sheet, by causing the sheet having the description entered to be read together with a fixed format sheet for entry of meeting minutes (having no items entered therein), which is obtained later.

A document processing apparatus according to a third embodiment performs an image scanning process different from the image scanning process carried out by the first embodiment. The construction and operation of the document processing apparatus other than the image scanning process are the same as those of the first embodiment.

Figure 13:
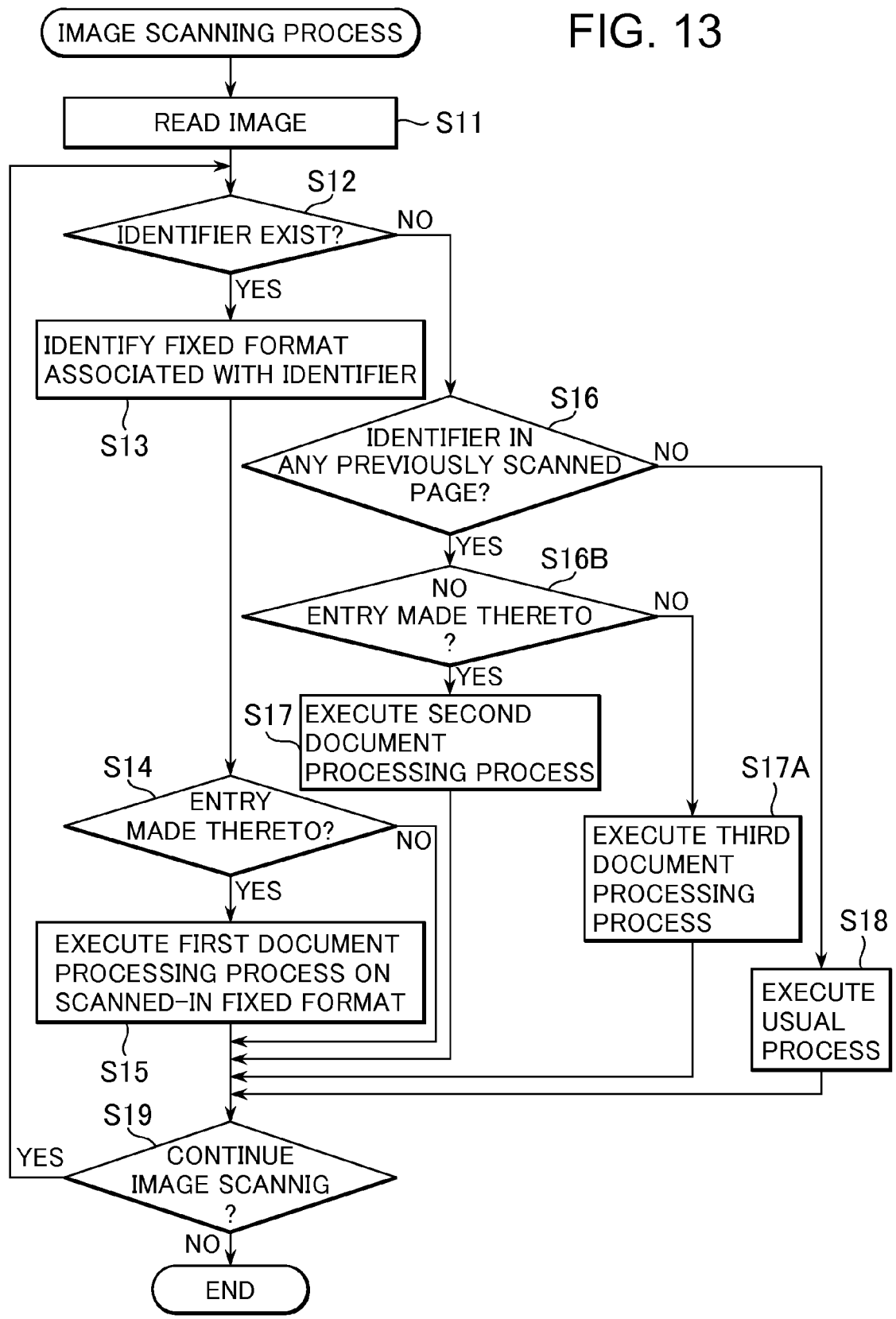
FIG. 13 is a flowchart of an image scanning process carried out by a multifunction machine as a document processing apparatus according to a third embodiment of the present invention.

FIG. 13 is a flowchart of the image scanning process carried out by the multifunction machine as the document processing apparatus according to the third embodiment. A program for the image scanning process is stored in the HDD 1130 of the controller 100, and is carried out by the CPU 1100. Steps identical to those in the first embodiment are designated by identical step numbers, and description thereof is omitted.

If it is determined in the step S12 that the scanned original has no identifier, the multifunction machine 10 determines whether or not any previously scanned page has an identifier (step S16). If it is determined that no previously scanned pages have an identifier, the multifunction machine 10 performs the usual process on the original currently scanned by the present image scanning process (step S18). Here, the term "usual process" indicates a process, such as copying, which has been set by the user via the operating section 180.

On the other hand, if it is determined in the step S16 that some previously scanned page has an identifier, the multifunction machine 10 determines whether or not any previously scanned fixed format sheet determined to have an identifier has an entry made thereto or not (step S16B). This determination is the same as the in the step S14, and if there is no entry in the entry boxes of a previously scanned fixed format sheet, it is determined that the sheet has no entry made thereto. On the other hand, if there is any entry in the entry boxes of the previously scanned fixed format sheet, it is determined that the sheet has an entry made thereto. This determination may only be performed by referring to the results of processing in the step S14 executed on the previously scanned pages.

If it is determined in the step S16B that the fixed format sheet on the previously scanned page has no entry made thereto, the multifunction machine 10 performs the second document processing process (step S17). This processing is executed by the document processing execution section 1134 based on the document processing information 1133 stored in the HDD 1130.

On the other hand, if it is determined in the step S16B that the fixed format sheet on the previously scanned page has an entry made thereto, the multifunction machine 10 performs a third document processing process (step S17A). Similarly to the second document processing process, the third document processing process is executed by the document processing execution section 1134 based on the document processing information 1133 stored in the HDD 1130. An example of the third document processing process will be described hereinafter.

Further, in the case of the present embodiment, it is assumed that the creation and transmission of a description of a document processing process, which is configured in the above-described embodiments to be performed by client PCs, is carried out not only on the first and second document processing processes but also on the third document processing process.

After completion of the steps S17, S17A, and S18, the multifunction machine 10 determines whether or not to continuously perform the scanning process on the next original following the currently scanned original (step S19). If it is determined that the image scanning process is to be continuously performed on the next original, the multifunction machine 10 returns to the step S12 to continuously perform the image scanning process on the next original. On the other hand, if it is determined in the step S19 that the image scanning process is not to be continuously performed on the next original, the multifunction machine 10 terminates the present image scanning process.

With the above-described configuration of the image scanning process, if a fixed format sheet having an entry made thereto is scanned in, the multifunction machine 10 executes the first document processing process. Further, in a case where a fixed format sheet having no entry made thereto has been previously scanned in, if a sheet other than the fixed format sheet is scanned in, the multifunction machine 10 executes the second document processing process. Further, in a case where a fixed format sheet having an entry made thereto has been previously scanned in, if a sheet other than the fixed format sheet is scanned in, the multifunction machine 10 executes the third document processing process. Further, in a case where no fixed format sheet has been previously scanned in, if a sheet other than the fixed format sheet is scanned in, the multifunction machine 10 executes the usual process.

A description will be given of the first to third document processing processes executed in the present embodiment using the fixed format for meeting minutes, by way of example. In the first document processing process, for example, the multifunction machine 10 extracts contents in the boxes for the respective items of the scanned fixed format, and causes the same to be stored in a minutes format-storing folder in the storage device 303 of the file server 30. Further, the multifunction machine 10 passes the image data of the scanned fixed format to the workflow server 31, to thereby cause the workflow server 31 to start a minutes circulation workflow process.

In the second document processing process, the multifunction machine 10 pastes (attaches) a description of meeting minutes extracted from the scanned-in sheet in the image scanning process to a box for the description of minutes in the minutes format stored therein. Further, the multifunction machine 10 has the date and the entry person name entered in respective entry boxes by the user via the operating section 180, and transmits completed data to the file server 30 to cause the data to be stored in the minutes format-storing folder of the storage device 303 of the file server 30. Furthermore, the multifunction machine 10 passes the image data to the workflow server 31 to cause the workflow server 31 to start the minutes circulation workflow process.

In the third document processing process, the multifunction machine 10 connects a description in the scanned-in sheet to a previously scanned-in fixed format sheet as a second page thereof. The multifunction machine 10 stores the connected data in the minutes format-storing folder of the storage device 303 of the file server 30. Furthermore, the multifunction machine 10 passes the connected data to the workflow server 31 to cause the workflow server 31 to start the minutes circulation workflow process.

With the configuration of the document processing apparatus according to the third embodiment, it is possible to expand the range of the document processing. That is, it is possible to obtain both of the advantageous effects provided by the first embodiment and the advantageous effects provided by the second embodiment.

Next, a description will be given of a document processing apparatus according to a fourth embodiment of the present invention. In the above-described first, second, and third embodiments, the details of the document processing (description of the first to third document processing processes) is stored as contents of the fixed format processing information table 1140 in the HDD 1130 of the multifunction machines 10 and 11. In the document processing apparatus according to the fourth embodiment, the descriptions of the document processing processes are not held in the multifunction machine, but are scanned in from identifiers added to fixed format sheets.

Similarly to the first to third embodiments, the document processing apparatus according to the fourth embodiment is applied to the multifunction machine. Further, component elements identical to those in the above-described first to third embodiments are designated by identical reference numerals, and detailed description thereof is omitted. More specifically, although the overall arrangement of the multifunction machine as the document processing apparatus according to the fourth embodiment, and the arrangement of a controller are the same as those in the first embodiment, information stored in the HDD 1130 are different from that in the first embodiment.

Figure 14:
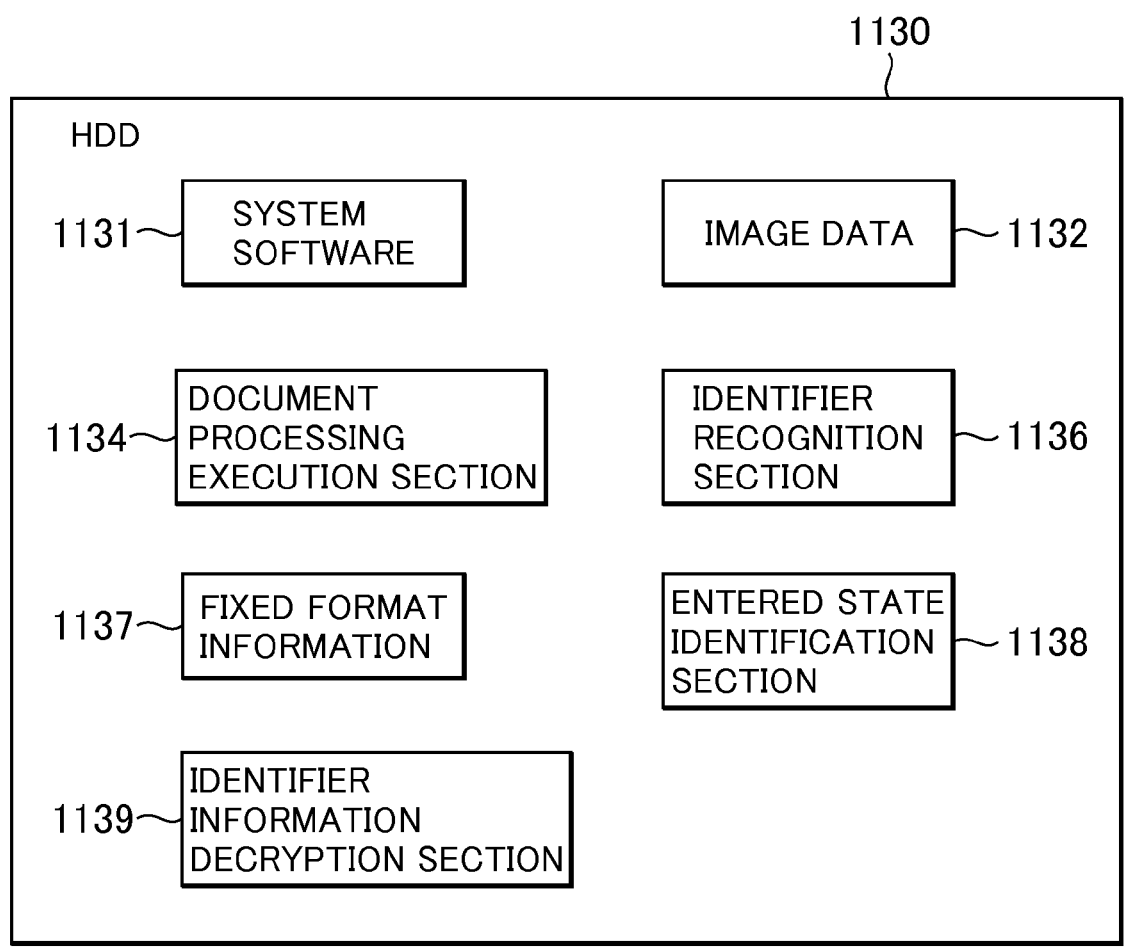
FIG. 14 is a view of information stored in an HDD of a multifunction machine as a document processing apparatus according to a fourth embodiment of the present invention.

FIG. 14 is a view of contents stored in the HDD 1130 of the multifunction machine as the document processing apparatus according to the fourth embodiment. In the fourth embodiment, the fixed format processing information table 1140 containing the document processing information 1133 and the identifier information 1135 is not stored in the HDD 1130, but the fixed format information 1137 is stored by itself in the HDD 1130, and an identifier information decryption section 1139 is newly added to the fixed format information 1137. The identifier information decryption section 1139 decodes an identifier given (added) to a fixed format, and determines which fixed format the original currently scanned is in. Further, the identifier information decryption section 1139 acquires document processing information on the scanned original as well from the identifier. The identifier may be any, including a type in which data is compressed and embedded, such as a QR code (registered trademark), insofar as it can be identified by the multifunction machine 10.

Figure 15:
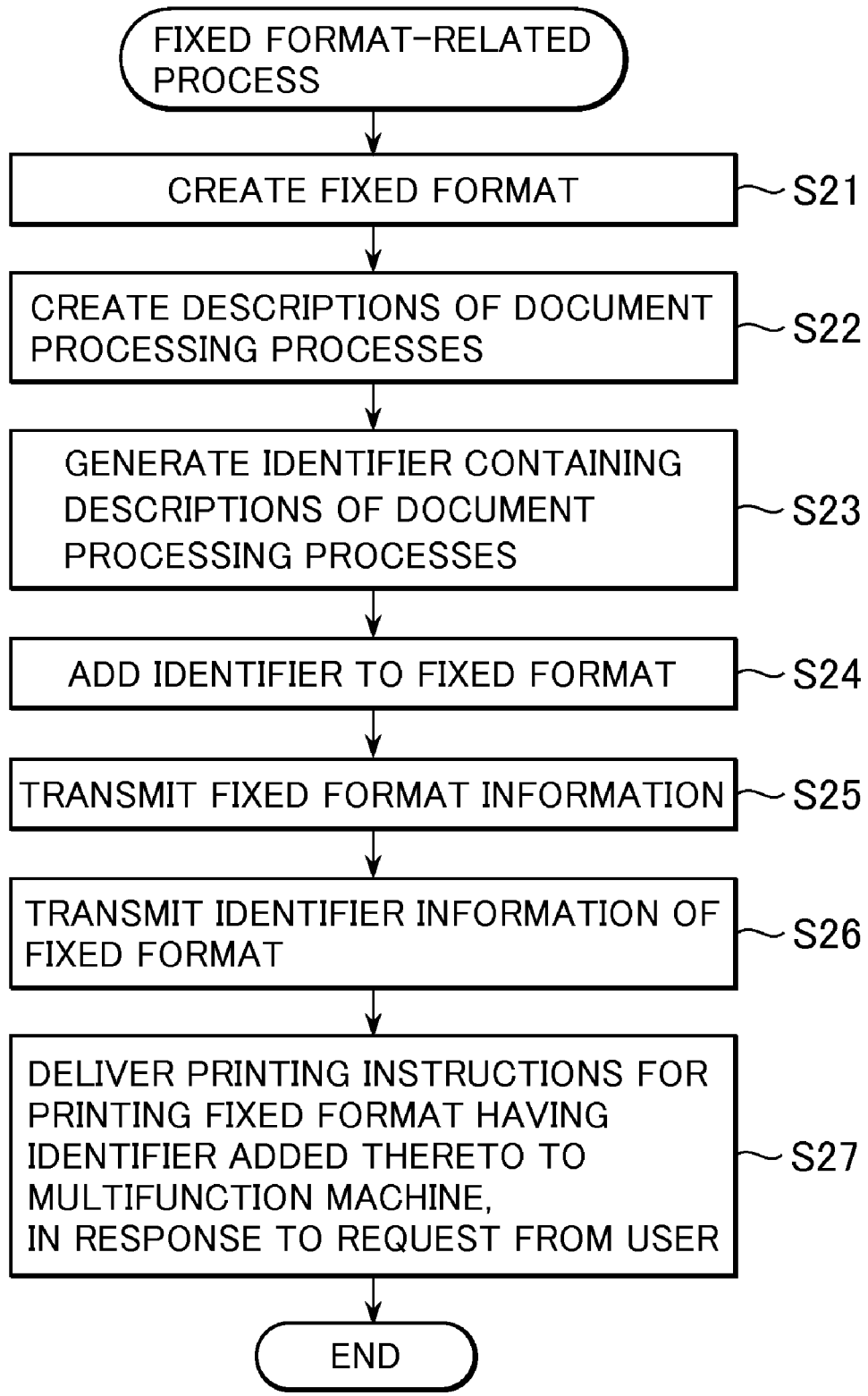
FIG. 15 is a flowchart of a fixed format-related process.

FIG. 15 is a flowchart of a fixed format-related process carried out by a client PC as the information processing apparatus. A program for the fixed format-related process is stored in a storage device, not shown, of the client PC 20 or 21, and is executed by a CPU, not shown, of the client PC 20 or 21. Although in the following, a description will be given assuming that the fixed format-related process in FIG. 15 is executed by the CPU of the PC 20, there is no problem in interpreting the description by assuming that the fixed format-based document processing is executed by a CPU, not shown, of the PC 21.

First, the client PC 20 creates a fixed format in response to an instruction from the user (step S21). The client PC 20 creates respective descriptions of a first document processing process and a second document processing process which are desired to be executed when a fixed format is scanned in by the multifunction machine (step S22).

Further, the client PC 20 generates an identifier for identifying the fixed format (step S23). In the created identifier, there are compressed and embedded information on which fixed format the original having the identifier thereon corresponds to and information showing descriptions of the document processing processes created in the step S22. The client PC 20 adds the generated identifier to the fixed format (step S24).

The client PC 20 transmits the information of the created fixed format to the multifunction machines 10 and 11 (step S25) and transmits the information of the identifier added to the fixed format to the multifunction machines 10 and 11 (step S26). By receiving these pieces of information, the multifunction machines 10 and 11 are each capable of realizing document processing to be executed when the fixed format is scanned in.

The client PC 20 gives printing instructions in response to a demand from the user so as to cause a required number of fixed format sheets to be printed out (step S27). After that, the client PC 20 terminates the present processing.

As described hereinabove, it is possible to create various kinds of information using the client PC, which improves user's convenience. Although in the present embodiment, information on the fixed format is not embedded in the identifier, if the amount of information which can be embedded in the identifier is large enough to embed information on the fixed format, the information on the fixed format may be also embedded in the identifier. In this case, the information on the fixed format need not be transmitted to the multifunction machines 10 and 11, the step S25 is omitted. Further, although in the present embodiment, the fixed format, the identifier, and the description of each document processing process are created by the client PC, if the system is configured such that the fixed format, the identifier, and the description of the document processing process can be created using the multifunction machine, they may be created by the multifunction machine.

Figure 16:
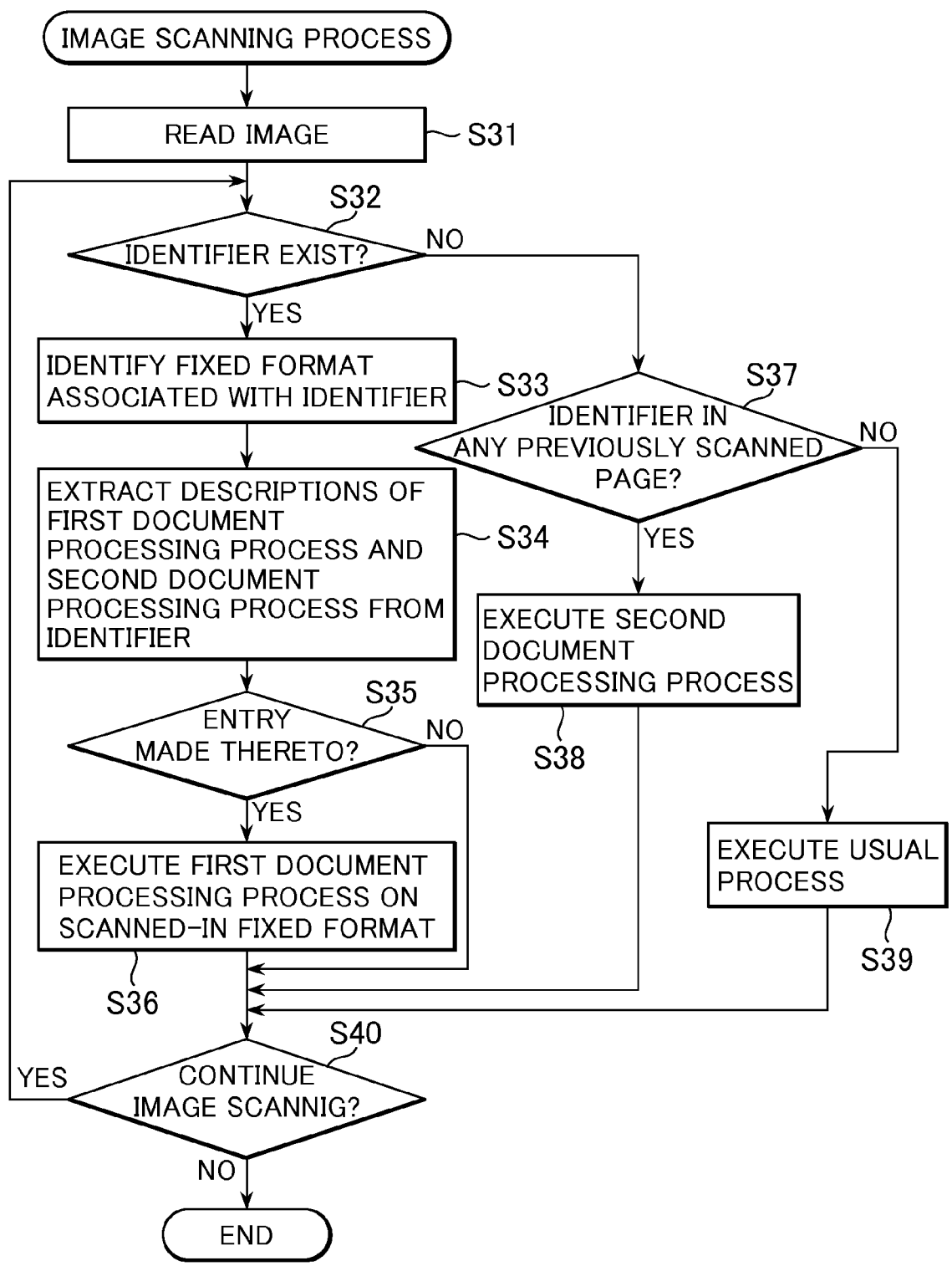
FIG. 16 is a flowchart of an image scanning process carried out by the multifunction machine.

FIG. 16 is a flowchart of an image scanning process carried out by the multifunction machine. A program for the image scanning process is stored in the HDD 1130 of the controller 100, and is executed by the CPU 1100.

First, the multifunction machine 10 scans in an image (step S31). The user sets an original or originals desired to cause the multifunction machine to scan in, on the tray 161 of the document feeder 160 of the scanner section 140, or sets an original on the platen glass of the scanner section 140, and depresses the start key 182 of the operating section 180, whereby the multifunction machine 10 executes an image scanning operation.

The multifunction machine 10 determines whether or not the scanned original has an identifier (step S32). Determination of whether or not the scanned original has an identifier is carried out by the identifier recognition section 1136 based on the identifier information added to the fixed format and decoded by the identifier information decryption section 1139.

If it is determined that the scanned original has no identifier, the multifunction machine 10 determines whether or not any previously scanned page has an identifier (step S37). Now, the term "any previously scanned page" is intended to mean "any of all the pages from a first page scanned in at the start of the present image scanning process to a page immediately preceding the page currently scanned in". Therefore, when the first page is scanned in, it is necessarily determined in the step S37 that no previously scanned pages have an identifier. If it is determined that no previously scanned pages have an identifier, the multifunction machine 10 performs a usual process on the original currently scanned in by the present image scanning process (step S39). Here, the term "usual process" indicates a process, such as copying, which has been set by the user via the operating section 180.

On the other hand, if it is determined in the step S16 that some previously scanned page has an identifier, the multifunction machine 10 performs the second document processing process (step S38). The second document processing process is executed by the document processing execution section 1134 based on the document processing information decoded from the identifier of the previously scanned page. The second document processing process is performed on image data (second image data) obtained by scanning in an image (referred to as "the second original image") on an original with no identifier, scanned-in in association with an image (referred to as "the first original image") on a previously scanned original with an identifier. After completion of the steps S38 and S39, the present process proceeds to a step S40.

On the other hand, if it is determined in the step S12 that the scanned original has an identifier, the multifunction machine 10 identifies a fixed format associated with the identified identifier (step S33). This enables the multifunction machine 10 to recognize that the original scanned in the step S11 is in a specific fixed format. To identify the fixed format, the multifunction machine 10 decoded the identifier and extracts information embedded therein. This extraction is performed by the identifier information decryption section 1139 stored in the HDD 1130.

The multifunction machine 10 further extracts document processing formation associated with the fixed format, such as the description of the first document processing process and that of the second document processing process, from the identifier (step S34). This extraction is also performed by the identifier information decryption section 1139 stored in the HDD 1130.

The multifunction machine 10 determines whether or not the scanned fixed format sheet has an entry made to a to-be-entered item (step S35). Determination of whether or not an entry has been made is performed by the entered state identification section 1138, based on the fixed format information 1137 stored in the HDD 1130. The entered state identification section 1138 is envisaged, by way of example, to be the same program module that executes the step S14 of FIG. 10 in the first embodiment. Here, if the fixed format information is embedded in the identifier, the fixed formation information 1137 may not be stored but be extracted from the identifier.

If it is determined in the step S35 that the scanned fixed format sheet has an entry made thereto, the multifunction machine 10 executes the first document processing process on the scanned fixed format sheet (step S36). The first document processing process is executed by the document processing execution section 1134 based on the document processing information decoded by the identifier information decryption section 1139 from the identifier added to the fixed format. Then, the multifunction machine 10 proceeds to a step S40. If it is determined in the step S35 that the scanned fixed format sheet has no entry made thereto, the multifunction machine 10 directly proceeds to the step S40.

The multifunction machine 10 determines whether or not to continuously perform the scanning process on the next original following the currently scanned original (step S40). For example, assuming that the user sets originals on the tray 161 of the document feeder 160 of the scanner section 140, it is determined whether or not to continuously perform the scanning process on the next original, by determining whether or not there still remains any original on the tray 161.

Further, when the user sets originals on the surface of the platen glass of the scanner section 140, it is possible to perform the determination by determining which timing the user depressed the "scan end" button displayed on the liquid-crystal operation panel 181 of the operating section 180. If any original scanned in before depression of the "scan end" button has not been processed yet, the answer to the question of the step S40 becomes affirmative (YES), and hence the image scanning process is continuously performed on the next original.

If it is determined in the step S40 that the image scanning process is to be continuously performed on the next original, the multifunction machine 10 returns to the step S32 to continuously perform the image scanning process on the next original. On the other hand, if it is determined in the step S40 that the image scanning process is not to be continuously performed on the next original, the multifunction machine 10 terminates the present image scanning process.

With the above-described configuration of the image scanning process, if a fixed format sheet having an entry made thereto is scanned in, the multifunction machine 10 decodes the identifier, and executes the first document processing process. Further, in a case where a fixed format sheet has been previously scanned in, if a sheet other than the fixed format sheet is scanned in, the multifunction machine 10 executes the second document processing process based on the information decoded from the identifier of the previously scanned original. Further, in a case where no fixed format sheet has been scanned in, if a sheet other than the fixed format sheet is scanned in, the multifunction machine 10 executes the usual process.

With the above-described configuration of the document processing apparatus according to the first embodiment, it is possible to cause a predetermined process to be performed using sheets of one fixed format, in both of the case of scanning a fixed format sheet which has a description entered therein and the case of scanning a sheet which has a description entered therein but is other than the fixed format sheet. This makes it possible to improve user's convenience. What is more, information on the document processing processes is extracted from the identifier, the descriptions of the document processing processes need not be stored in the multifunction machine.

A document processing apparatus according to a fifth embodiment of the present invention performs an image scanning process different from the image scanning process carried out by the document processing apparatus according to the fourth embodiment. The configuration and operation of the document processing apparatus other than the image scanning process are the same as those of the fourth embodiment.

Figure 17:
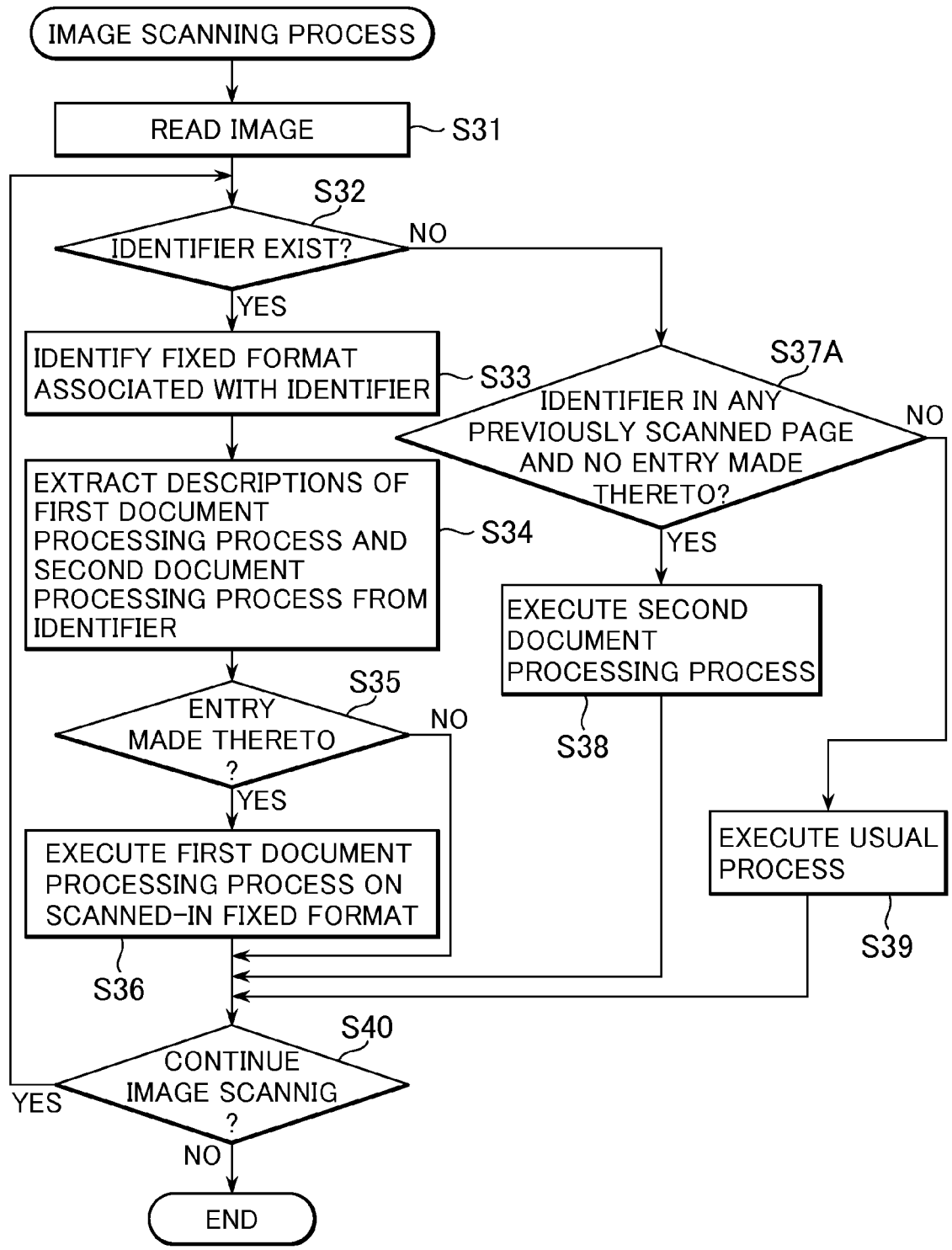
FIG. 17 is a flowchart of an image scanning process carried out by a multifunction machine as a document processing apparatus according to a fifth embodiment of the present invention.

FIG. 17 is a flowchart of the image scanning process carried out by the multifunction machine as the document processing apparatus according to the fifth embodiment. A program for the image scanning process is stored in the HDD 1130 of the controller 100, and is executed by the CPU 1100. Steps identical to those in the first embodiment are designated by identical step numbers, and description thereof is omitted.

If it is determined in the step S32 that the scanned original has no identifier, the multifunction machine 10 determines whether or not any previously scanned page has an identifier and at the same time has no entry made thereto (step S37A). If it is determined that no previously scanned pages have an identifier, or although some previously scanned page has an identifier but has an entry made thereto, the multifunction machine 10 performs the usual process on the original currently scanned in the present scanning process in the step S39. Now, the term "usual process" indicates a process, such as copying, which has been set by the user via the operating section 180.

On the other hand, if it is determined in the step S37A that some previously scanned page has an identifier, and at the same time has no entry made thereto, the multifunction machine 10 executes the second document processing process (step S38). This second document processing process is executed by the document processing execution section 1134 based on the document processing information decoded by the identifier information decryption section 1139 from the identifier added to the fixed format.

After completion of the steps S17 and S18, the multifunction machine 10 determines whether or not to continuously perform the scanning process on the next original following the currently scanned original (step S40). If it is determined that the image scanning process is to be continuously performed on the next original, the multifunction machine 10 returns to the step S32 to continuously perform the image scanning process on the next original.

On the other hand, if it is determined in the step S40 that the image scanning process is not to be continuously performed on the next original, the multifunction machine 10 terminates the present image scanning process.

With the above-described configuration of the image scanning process, if a fixed format sheet having an entry made thereto is scanned in, the multifunction machine 10 decodes the identifier, and executes the first document processing process. Further, in a case where a fixed format sheet having no entry made thereto has been previously scanned in, if a sheet other than the fixed format sheet is scanned in, the multifunction machine 10 executes the second document processing process. Further, in a case where no fixed format sheet has been previously scanned in or in a case where a fixed format sheet having an entry made thereto has been previously scanned in, if a sheet other than the fixed format sheet is scanned in, the multifunction machine 10 executes the usual process.

According to the document processing apparatus of the fifth embodiment, it is possible to print registered image data of a fixed format having no entry made thereto, and use the printed material as a template for causing the second document processing process to be performed on contents entered in a sheet other than the fixed format sheet.

A document processing apparatus according to a sixth embodiment performs an image scanning process different from the image scanning process carried out by the fourth embodiment. The construction and operation of the document processing apparatus, other than the image scanning process are the same as those of the fourth embodiment.

Figure 18:
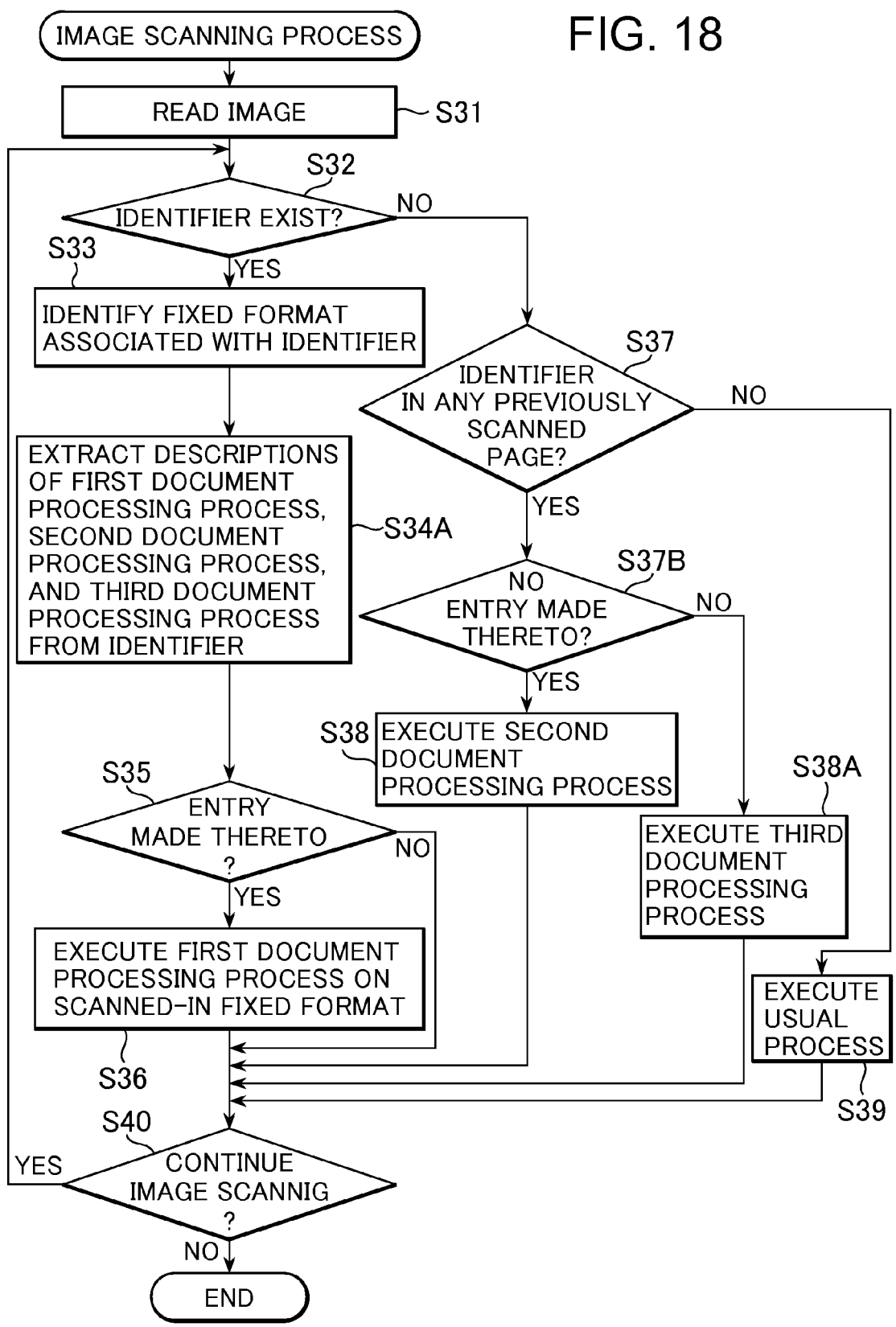
FIG. 18 is a flowchart of an image scanning process carried out by a multifunction machine as a document processing apparatus according to a sixth embodiment of the present invention.

FIG. 18 is a flowchart of the image scanning process carried out by the multifunction machine as the document processing apparatus according to the sixth embodiment. A program for the image scanning process is stored in the HDD 1130 of the controller 100, and is executed by the CPU 1100. Steps identical to those in the first embodiment are designated by identical step numbers, and description thereof is omitted.

If it is determined in the step S32 that the scanned original has no identifier, the multifunction machine 10 determines whether or not any previously scanned page has an identifier (step S37). If it is determined that no previously scanned pages have an identifier, the multifunction machine 10 performs the usual process on the original currently scanned in the present scanning process (step S39). Now, the term "usual process" indicates a process, such as copying, which has been set by the user via the operating section 180.

On the other hand, if it is determined in the step S37 that some previously scanned page has an identifier, the multifunction machine 10 determines whether or not the fixed format of the previously scanned page having an identifier has an entry made thereto (step S37B). This determination is the same as executed in the step S35, and when there is no entry made to any entry box of the fixed format of the previously scanned page, it is determined that the previously scanned page has no entry made thereto, whereas if an entry is made to any of the entry boxes, it is determined that the previously scanned fixed format sheet has an entry made thereto. This determination may only be performed by referring to the results of processing in the step S14 executed on the previously scanned pages.

If it is determined in the step S37B that the fixed format of the previously scanned page having an identifier has no entry made thereto (step S38), the multifunction machine 10 executes the second document processing process (step S38). This second document processing process is executed by the document processing execution section 1134 based on the document processing information extracted from the identifier.

On the other hand, if it is determined in the step S37B that the fixed format of the previously scanned page having an identifier has an entry made thereto, the multifunction machine 10 executes the third document processing process (step S39). This process is executed similarly to the second document processing process by the document processing execution section 1134 based on the document processing information extracted from the identifier.

In the present embodiment, the creation of a description of a document processing process which is to be executed by a client PC is performed not only for the first and second document processing processes but also for the third document processing process. Then, the descriptions of all these processes are embedded as information in the identifier. Therefore, in the present embodiment, descriptions of the first to third document processing processes are extracted from the identifier, in a step S34A.

After completion of the steps S38, S38A, and S39, the multifunction machine 10 determines whether or not to continuously perform the scanning process on the next original following the currently scanned original (step S40). If it is determined that the image scanning process is to be continuously performed on the next original, the multifunction machine 10 returns to the step S32 to continuously perform the image scanning process on the next original. On the other hand, if it is determined that the image scanning process is not to be continuously performed on the next original, the multifunction machine 10 terminates the present image scanning process.

With the above-described configuration of the image scanning process, if a fixed format sheet having an entry made thereto is scanned in, the multifunction machine 10 decodes the identifier, and executes the first document processing process. Further, in a case where a fixed format sheet having no entry made thereto has been previously scanned in, if a sheet other than the fixed format sheet is scanned in, the multifunction machine 10 executes the second document processing process based on information decoded from the identifier of the previously scanned original. Further, in a case where a fixed format sheet having an entry made thereto has been previously scanned in, if a sheet other than the fixed format sheet is scanned in, the multifunction machine 10 executes the third document processing process based on information decoded from the identifier of the previously scanned original. Further, in a case where no fixed format sheet has been previously scanned in, if a sheet other than the fixed format sheet is scanned in, the multifunction machine 10 executes the usual process With the above-described configuration of the document processing apparatus according to the sixth embodiment, it is possible to expand the range of the document processing.

The present invention is not limited to the above described embodiment and can be applied to any construction that can achieve the functions described in the appended claims or the functions of the construction of the above described embodiment.

For example, although in the above-described embodiments, the description of the document processing process is mad different depending on whether or not there any page scanned in before scanning of a page having no identifier has an identifier, it may be made different depending on whether or not a page scanned in after scanning a page having no identifier has an identifier. In this case, however, the document processing on the previously scanned page having no identifier is caused to wait.

Further, the present invention may be applied to a system constructed by a plurality of devices or to an apparatus constructed by one device.

It is to be understood that the present invention may also be accomplished by supplying a system or an apparatus with a storage medium in which a program code of software, which realizes the functions of either of the above described embodiments, is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-036033 filed Feb. 18, 2008, which is hereby incorporated by reference herein in its entirety.

What is claimed is:

1. A document processing apparatus comprising:
a reading unit configured to read an original image to thereby generate image data;
a recognition unit configured to recognize whether or not the original image read by said reading unit is of a specific format;
a determination unit configured to be operable when said recognition unit recognizes that a first original image read by said reading unit is of a specific format, to determine whether or not the first original image is of the specific format having an entry made thereto;
a first processing unit configured to be operable when said determination unit determines that the first original image is of the specific format having an entry made thereto, to perform a first processing associated with the specific format on first image data generated by said reading unit by reading the first original image; and
a second processing unit configured to perform second processing associated with the specific format on second image data generated by said reading unit by reading a second original image in association with the first original image, the second original image being not recognized by said recognition unit to be of the specific format,
wherein said recognition unit recognizes, based on an identifier extracted from the image data, whether or not the original image read by said reading unit is of a specific format, and
wherein the document processing apparatus is connected to an external information processing apparatus that creates information indicative of the identifier, information concerning the specific format associated with the identifier, and information indicative of the first processing and the second processing,
the document processing apparatus further comprising:
a receiving unit configured to receive the information indicative of the identifier, the information concerning the specific format associated with the identifier, and the information indicative of the first processing and the second processing, from the information processing apparatus; and
a storage unit configured to store the information indicative of the identifier, the information concerning the specific format associated with the identifier, and the information indicative of the first processing and the second processing, which are transmitted from the information processing apparatus.

2. The document processing apparatus according to claim 1, wherein when said determination unit determines that the first original image is not of the specific format having an entry made thereto, said first processing unit does not perform the first processing on the first image data.

3. The document processing apparatus according to claim 1, wherein the document processing apparatus is connected to an external server apparatus, and
wherein the first processing is for extracting image data of a portion entered to the specific format, from the first image data, and transmitting the extracted image data to the server apparatus, and the second processing is for transmitting the second image data to the server apparatus.

4. The document processing apparatus according to claim 1, wherein the second original image read by said reading unit in association with the first original image is an original image read by said reading unit as continuing from the first original image.

5. A document processing apparatus comprising:
a reading unit configured to read an original image to thereby generate image data;
a recognition unit configured to recognize whether or not the original image read by said reading unit is of a specific format;
a determination unit configured to be operable when said recognition unit recognizes that a first original image read by said reading unit is of a specific format, to determine whether or not the first original image is of the specific format having an entry made thereto;
a first processing unit configured to be operable when said determination unit determines that the first original image is of the specific format having an entry made thereto, to perform a first processing associated with the specific format on first image data generated by said reading unit by reading the first original image; and
a second processing unit configured to perform second processing associated with the specific format on second image data generated by said reading unit by reading a second original image in association with the first original image, the second original image being not recognized by said recognition unit to be of the specific format,
wherein said recognition unit recognizes, based on an identifier extracted from the image data, whether or not the original image read by said reading unit is of a specific format,
wherein the identifier has information indicative of the first processing and the second processing embedded therein, and
wherein said recognition unit reads out the first processing and the second processing from the identifier extracted from the image data.

6. A document processing method executed by a document processing apparatus, comprising the steps of:
reading an original image to thereby generate image data;
recognizing whether or not the original image read by said reading is of a specific format;
determining, when it is recognized in said recognizing step that a first original image read by said reading is of a specific format, whether or not the first original image is of the specific format having an entry made thereto;
performing, when it is determined by said determination that the first original image is of the specific format having an entry made thereto, a first processing associated with the specific format on first image data generated by said reading by reading the first original image; and
performing a second processing associated with the specific format on second image data generated by said reading by reading a second original image in association with the first original image, the second original image being not recognized in said recognizing step to be of the specific format,
wherein said recognizing step includes recognizing, based on an identifier extracted from the image data, whether or not the original image read in said reading step is of a specific format, and
wherein the document processing apparatus is connected to an external information processing apparatus that creates information indicative of the identifier, information concerning the specific format associated with the identifier, and information indicative of the first processing and the second processing,
the document processing method further comprising the steps of:
receiving the information indicative of the identifier, the information concerning the specific format associated with the identifier, and the information indicative of the first processing and the second processing, from the information processing apparatus; and
storing the information indicative of the identifier, the information concerning the specific format associated with the identifier, and the information indicative of the first processing and the second processing, which are transmitted from the information processing apparatus,
wherein each of said steps are performed at least by a processing device of the document processing apparatus.

7. A non-transitory computer-readable storage medium which stores a control program for causing a computer to execute a document processing method executed by a document processing apparatus,
wherein the document processing method comprises the steps of:
reading an original image to thereby generate image data;
recognizing whether or not the original image read by said reading is of a specific format;
determining, when it is recognized in said recognizing step that a first original image read by said reading is of a specific format, whether or not the first original image is of the specific format having an entry made thereto;
performing, when it is determined by said determination that the first original image is of the specific format having an entry made thereto, a first processing associated with the specific format on first image data generated by said reading by reading the first original image; and
performing a second processing associated with the specific format on second image data generated by said reading by reading a second original image in association with the first original image, the second original image being not recognized in said recognizing step to be of the specific format,
wherein said recognizing step includes recognizing, based on an identifier extracted from the image data, whether or not the original image read in said reading step is of a specific format, and
wherein the document processing apparatus is connected to an external information processing apparatus that creates information indicative of the identifier, information concerning the specific format associated with the identifier, and information indicative of the first processing and the second processing, the document processing method further comprising the steps of:

receiving the information indicative of the identifier, the information concerning the specific format associated with the identifier, and the information indicative of the first processing and the second processing, from the information processing apparatus; and storing the information indicative of the identifier, the information concerning the specific format associated with the identifier, and the information indicative of the first processing and the second processing, which are transmitted from the information processing apparatus, wherein each of said steps are performed at least by a processing device of the document processing apparatus.

8. A document processing method executed by a document processing apparatus, comprising the steps of:

reading an original image to thereby generate image data;

recognizing whether or not the original image read by said reading is of a specific format;

determining, when it is recognized in said recognizing step that a first original image read by said reading is of a specific format, whether or not the first original image is of the specific format having an entry made thereto;

performing, when it is determined by said determination that the first original image is of the specific format having an entry made thereto, a first processing associated with the specific format on first image data generated by said reading by reading the first original image; and performing a second processing associated with the specific format on second image data generated by said reading by reading a second original image in association with the first original image, the second original image being not recognized in said recognizing step to be of the specific format, wherein said recognizing step includes recognizing, based on an identifier extracted from the image data, whether or not the original image read in said reading step is of a specific format, wherein the identifier has information indicative of the first processing and the second processing embedded therein, wherein said recognizing step includes reading out the first processing and the second processing from the identifier extracted from the image data, and wherein each of said steps are performed at least by a processing device of the document processing apparatus.

9. A non-transitory computer-readable storage medium which stores a control program for causing a computer to execute a document processing method executed by a document processing apparatus, wherein the document processing method comprises the steps of:

reading an original image to thereby generate image data;

recognizing whether or not the original image read by said reading is of a specific format;

determining, when it is recognized in said recognizing step that a first original image read by said reading is of a specific format, whether or not the first original image is of the specific format having an entry made thereto;

performing, when it is determined by said determination that the first original image is of the specific format having an entry made thereto, a first processing associated with the specific format on first image data generated by said reading by reading the first original image; and performing a second processing associated with the specific format on second image data generated by said reading by reading a second original image in association with the first original image, the second original image being not recognized in said recognizing step to be of the specific format, wherein said recognizing step includes recognizing, based on an identifier extracted from the image data, whether or not the original image read in said reading step is of a specific format, wherein the identifier has information indicative of the first processing and the second processing embedded therein, and wherein said recognizing step includes reading out the first processing and the second processing from the identifier extracted from the image data.

* * * * *